United States Patent [19]

Mendez et al.

[11] Patent Number: 6,025,944
[45] Date of Patent: Feb. 15, 2000

[54] WAVELENGTH DIVISION MULTIPLEXING/CODE DIVISION MULTIPLE ACCESS HYBRID

[75] Inventors: Antonio J. Mendez, El Segundo, Calif.; Charles A. Finnila, Las Vegas, Nev.; Robert M. Gagliardi, Los Angeles, Calif.

[73] Assignee: Mendez R&D Associates, El Segundo, Calif.

[21] Appl. No.: 08/828,030

[22] Filed: Mar. 27, 1997

[51] Int. Cl.[7] .............................. H04J 14/08; H04J 14/02
[52] U.S. Cl. .......................... 359/136; 359/124; 359/123
[58] Field of Search .................................... 359/123, 124, 359/128, 136; 370/335

[56] References Cited

U.S. PATENT DOCUMENTS

| | | | |
|---|---|---|---|
| D. 277,583 | 2/1985 | Kono .................................... | 16/130 D |
| 4,522,462 | 6/1985 | Large et al. .......................... | 350/96.19 |
| 4,726,644 | 2/1988 | Mathis .................................. | 350/96.16 |
| 4,787,693 | 11/1988 | Kogelnik et al. .................... | 350/96.16 |
| 4,866,699 | 9/1989 | Brackett et al. ............................ | 370/3 |
| 4,906,064 | 3/1990 | Cheung .................................. | 350/96.15 |
| 4,989,199 | 1/1991 | Rzeszewski ................................. | 370/1 |
| 4,989,937 | 2/1991 | Mahlein et al. ....................... | 350/96.15 |
| 5,109,446 | 4/1992 | Kaltschmidt .............................. | 385/24 |
| 5,134,672 | 7/1992 | Imoto et al. .............................. | 385/16 |
| 5,143,577 | 9/1992 | Haas et al. .............................. | 156/625 |
| 5,175,777 | 12/1992 | Bottle ........................................ | 385/17 |
| 5,179,604 | 1/1993 | Yanagawa et al. ....................... | 385/24 |

(List continued on next page.)

OTHER PUBLICATIONS

Tancevski et al., "Hybrid wavelength hopping/time spreading code division multiple access systems", IEE Proc.–optoelctron. vol. 143, No. 3, Jun. 1996. pp. 161–162, Jun. 1996.

Mendez et al., "Code Division Multiple Access(CDMA) Enhancement of Wavelength Division Multiplexing(WDM) Systems". IEEE Conference Paper. pp. 271–276. 18–22 Jun. 1995.

"Silica–Based 8×8 Optical Matrix Switch Module with Hybrid Integrated Driving Circuits and its System Application"–Journal of Lightwave Tech. vol. 12 pp. 1631–1638, Sep. 1994.

"Optical Code–Division–Multiplexed Systems Based on Spectral Encoding of Noncohereant Sources " Journal of Lightwave Technology, vol. 13, pp. 534–545, Mar. 1995.

"Demonstration of Simultaneous and Indegradable Switching of 8 Wavelength Channels with 2nm Spacing Using a Wavelength–Dilated Acousto–Optical Switch"LEOS'95 Postdeadline Session, PDI.2, Nov. 1, 1995.

Antonio, J. Mendez et al., Synthesis and Demonstration of High Speed, Bandwidth Efficient Optical Code Division Multiple Access (CDMA) Tested at 1 Gb/s Throughput, Sep. 1994, IEEE Photonics Letters, vol. 6, No. 9.

*Primary Examiner*—Kinfe-Michael Negash
*Attorney, Agent, or Firm*—Norton R. Townsley

[57] ABSTRACT

The present invention is a wavelength division multiplexing (WDM)/code division multiple access (CDMA) hybrid code fiber optic communication device. It provides multiple, concurrent, asynchronous, bursty communication at up to full data rate at each port. The invention includes a novel physical channel scrambling technique which allows coders and decoders to conveniently select any encoded channel and increases the communications throughput. This hybrid approach combines WDM with a form of space/time division multiplexing (matrix codes) applied to each data bit so that up to P channels can be defined and simultaneously used without having the stringent hardware requirements for P different wavelengths or P different time slots. To alleviate cross-channel interference that can produce an error rate limitation in both optical matrix CDMA and WDM/CDMA Hybrid codes, a modification of this invention has been designed. This modification includes novel very high speed optical detection threshold determination which can cancel or discriminate part of the data dependent cross-channel interference.

66 Claims, 21 Drawing Sheets

U.S. PATENT DOCUMENTS

| | | | |
|---|---|---|---|
| 5,189,542 | 2/1993 | Oudar | 359/128 |
| 5,233,453 | 8/1993 | Sivarajan et al. | 359/117 |
| 5,245,681 | 9/1993 | Guignard et al. | 385/16 |
| 5,233,453 | 8/1993 | Sivarajan et al. | 359/117 |
| 5,245,681 | 9/1993 | Guignard et al. | 385/16 |
| 5,247,593 | 9/1993 | Lin et al. | 385/17 |
| 5,289,454 | 2/1994 | Mohapatra et al. | 369/112 |
| 5,305,412 | 4/1994 | Paoli | 385/122 |
| 5,325,453 | 6/1994 | Drissler | 385/75 |
| 5,367,586 | 11/1994 | Glance et al. | 385/24 |
| 5,377,222 | 12/1994 | Sanderford, Jr. | 375/1 |
| 5,414,548 | 5/1995 | Tachikawa et al. | 359/130 |
| 5,432,874 | 7/1995 | Muraguchi | 385/24 |
| 5,475,778 | 12/1995 | Webb | 385/31 |
| 5,519,803 | 5/1996 | Shiono et al. | 385/132 |
| 5,760,941 | 6/1998 | Young et al. | 359/136 |

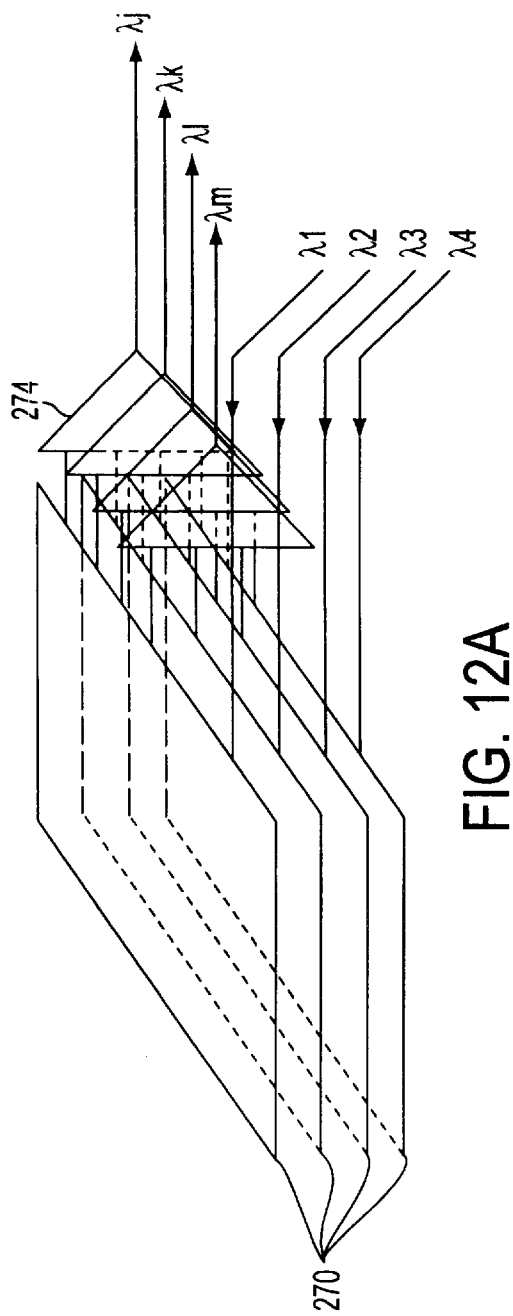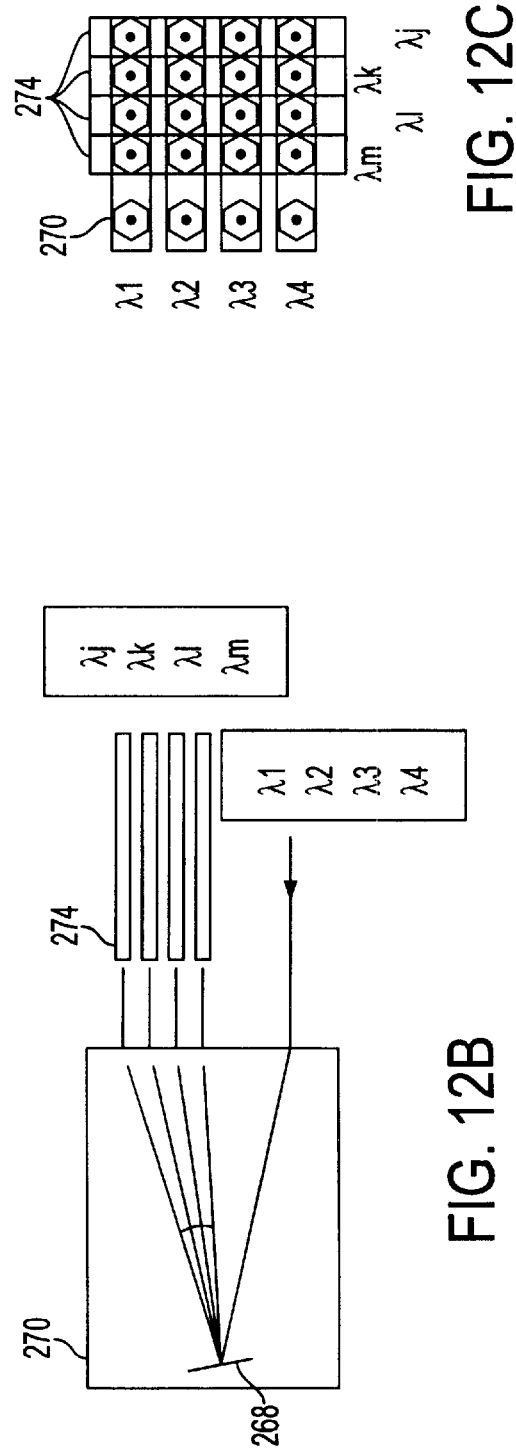
FIG. 12A
FIG. 12B
FIG. 12C

| INPUT VECTOR | S11 (bx) / S12 (bx) | | S21 (bx) / S22 (bx) | | S31 (bx) / S32 (bx) | | OUTPUT VECTOR | |
|---|---|---|---|---|---|---|---|---|
| (1,2,3,4) | b | b | b | b | b | b | (1,2,3,4) | W1 |
| (1,2,3,4) | x | x | b | x | b | b | (2,3,4,1) | W2 |
| (1,2,3,4) | b | b | x | x | b | b | (3,4,1,2) | W3 |
| (1,2,3,4) | x | x | x | b | b | b | (4,1,2,3) | W4 |
| (1,2,3,4) | x | b | x | x | x | b | (4,3,2,1) | W5 |
| (1,2,3,4) | b | b | b | x | b | b | (1,4,3,2) | W6 |
| (1,2,3,4) | x | x | b | b | b | b | (2,1,4,3) | W7 |
| (1,2,3,4) | b | b | x | b | b | b | (3,2,1,4) | W8 |
| (1,2,3,4) | x | b | b | b | b | b | (2,1,3,4) | W9 |
| (1,2,3,4) | b | x | x | b | b | b | (4,2,1,3) | W10 |
| (1,2,3,4) | x | b | x | x | b | b | (3,4,2,1) | W11 |
| (1,2,3,4) | b | x | b | x | b | b | (1,3,4,2) | W12 |
| (1,2,3,4) | b | x | b | x | b | x | (1,3,2,4) | W13 |
| (1,2,3,4) | b | b | b | x | x | b | (4,1,3,2) | W14 |
| (1,2,3,4) | b | x | x | b | x | b | (2,4,1,3) | W15 |
| (1,2,3,4) | x | x | b | x | x | b | (3,2,4,1) | W16 |
| (1,2,3,4) | b | x | b | b | b | b | (1,2,4,3) | W17 |
| (1,2,3,4) | x | b | x | b | b | b | (3,1,2,4) | W18 |
| (1,2,3,4) | b | x | x | x | b | b | (4,3,1,2) | W19 |
| (1,2,3,4) | x | b | b | x | b | b | (2,4,3,1) | W20 |
| (1,2,3,4) | b | b | b | x | b | x | (1,4,2,3) | W21 |
| (1,2,3,4) | b | x | b | x | x | b | (3,1,4,2) | W22 |
| (1,2,3,4) | b | b | x | b | x | b | (2,3,1,4) | W23 |
| (1,2,3,4) | b | x | x | b | b | x | (4,2,3,1) | W24 |

$$M = \begin{bmatrix} 1 & 1 & 0 & 0 & 0 & 0 & 0 & 0 \\ 1 & 0 & 0 & 0 & 0 & 0 & 1 & 0 \\ 0 & 0 & 1 & 0 & 1 & 0 & 0 & 0 \\ 0 & 0 & 0 & 0 & 0 & 1 & 0 & 0 \end{bmatrix} = \begin{bmatrix} V4 \\ V3 \\ V2 \\ V1 \end{bmatrix}$$

$$PM = \begin{bmatrix} 0 & 0 & 0 & 0 & 0 & 0 & 1 & 0 \\ 1 & 1 & 0 & 0 & 0 & 0 & 0 & 0 \\ 1 & 0 & 0 & 0 & 0 & 0 & 1 & 0 \\ 0 & 0 & 1 & 0 & 1 & 0 & 0 & 0 \end{bmatrix} = \begin{bmatrix} V5 \\ V4 \\ V3 \\ V2 \end{bmatrix}$$

$$P^2M = \begin{bmatrix} 0 & 0 & 0 & 1 & 0 & 1 & 0 & 0 \\ 0 & 0 & 0 & 0 & 0 & 0 & 1 & 0 \\ 1 & 1 & 0 & 0 & 0 & 0 & 0 & 0 \\ 1 & 0 & 0 & 0 & 0 & 0 & 1 & 0 \end{bmatrix} = \begin{bmatrix} V6 \\ V5 \\ V4 \\ V3 \end{bmatrix}$$

$$P^3M = \begin{bmatrix} 0 & 1 & 0 & 0 & 0 & 0 & 0 & 1 \\ 0 & 0 & 0 & 1 & 0 & 1 & 0 & 0 \\ 0 & 0 & 0 & 0 & 0 & 0 & 1 & 0 \\ 1 & 1 & 0 & 0 & 0 & 0 & 0 & 0 \end{bmatrix} = \begin{bmatrix} V7 \\ V6 \\ V5 \\ V4 \end{bmatrix}$$

FIG. 15

WAVELENGTH DIVISION MULTIPLEXING/ CODE DIVISION MULTIPLE ACCESS HYBRID

CROSS REFERENCES

This application is related to and specifically incorporates the disclosures of the following prior submitted design patent applications:

1. Docket AM3, titled "OPTICAL WAVEGUIDE SPLITTER COUPLER WITH EQUALIZED OPTICAL PATHS", Ser. No. 29/062,257, filed Nov. 12, 1996;
2. Docket AM5, titled "QUANTIZED PHOTONIC DELAY LINE", Ser. No. 29/061,856, filed Nov. 1, 1996;
3. Docket AM6, titled "INTEGRATED WAVE DIVISION MULTIPLEXING SCRAMBLER, CODE DIVISION MULTIPLE ACCESS PERMUTING SWITCH AND QUANTIZED PHOTONIC DELAY LINE, Ser. No. 29/062,688, filed Nov. 21, 1996.

BACKGROUND OF THE INVENTION

The present invention relates to the field of optical tele- and data-communications networks. More particularly the present invention relates to increasing the capacity throughput or the reconfigurability of such networks.

Optical Code Division Multiple Access (CDMA) is a viable multiple access format that permits efficient network control and switching, primarily because it overcomes the limitations of switching time associated with optoelectronic devices and the processing delay associated with network protocols. These switching time and processing delay limitations are particularly serious for ultra dense, Gigabit per second (Gb/s) networks. CDMA permits combined use of wavelength, frequency, time, and space, therefore increasing the information capacity of communication systems and devices. CDMA, unfortunately, has limitations associated with the crosstalk of its codes and its bandwidth expansion requirements. These CDMA limitations have been considered serious enough to hinder CDMA from being a contender for any of the emerging ultra dense, Gb/s systems. However, it is known that the crosstalk limitation of CDMA codes can be reduced by suitable code design and signal processing, and the bandwidth requirements of CDMA can be reduced by conditioning the code on several waveform attributes rather than only a single dimension, such as time, as in optical orthogonal codes (OOC), or wavelength, as in coherent spectral CDMA.

The problem to be solved by means of the proposed invention pertains to concurrent, non-blocking communication among P ports in a P×P network. The application is to communication which may be bursty and/or asynchronous and where no common system clock is to be invoked. Conventional, temporal, optical CDMA approaches have demonstrated, for example, that, using on-off pulse sequences as the coding technique, a network of eight users operating at a data rate of 1 Gb/s per port would require laser transceivers which produce, detect, and process symbols with pulse widths of about 5 picoseconds (i.e., shorter pulses than for comparable time division multiple access, TDMA systems). The objective of the invention is to maintain the same multiple access capability and data rate while relaxing pulse width (bandwidth) requirements. Coherent spectral CDMA approaches, which require transform limited femtosecond pulses, have corresponding problems and complexities.

In U.S. Pat. No. 4,866,699, Brackett et al. disclose an optical telecommunications system based on coherent spectral CDMA. At each transmitter and receiver station, Fourier components of radiation pulses are independently phase modulated. For a particular pair of transmitting and receiving stations to communicate exclusively, the modulation introduced at the transmitting station must be equal and opposite to that produced at the receiving station. This creates a kind of "lock" and "key" whereby desired information is communicated and all other is rejected. The "key" and "lock" terminology is analogous to "encoding" and "decoding".

Brackett et al.'s method of optical CDMA (1) depends on very narrow pulses (picosecond in the patent; in practice, sub-picosecond or femtosecond pulses are required) and (2) has encoding and decoding which is effected transversely to the direction of light propagation. The method relies on spectral slicing of a continuous wavelength spectrum. The encoding/decoding can be effected by means of amplitude or phase encoding. The codes typically must have approximately the same number of "1s" and "0s".

Many investigators and inventors have tried to solve the limitations of CDMA. In "Optical Code-Division-Multiplexed Systems Based on Spectral Encoding of Non-coherent Sources", *Journal of Lightwave Technology*, vol. 13, pp. 534–545, March 1995, M. Kavehrad and D. Zaccarin discuss CDMA as frequency encoded (FE) CDMA where spectral, not time, coding is used for additional performance advantage. In the referenced case, non-coherent, broadband sources are used instead of the narrow, pulsed, coherent sources in order to create a broad spectrum for encoding, but the total number of active channels is still limited by the available number of CDMA codes.

In U.S. Pat. No. 4,906,064, Cheung discloses an all optical switch for interconnecting a plurality of input optical fibers with a plurality of output optical fibers. The basic 2×2 switch unit has a first and second input, a first and second output, a mode combiner, a mode toggle control and a mode separator. All wavelengths arriving via the first input have the same propagation mode. All wavelengths arriving via the second input have an orthogonal propagation mode. Wavelengths from the first and second inputs are combined in the combiner. In the toggle control, a signal converts any of the input wavelengths completely or partially to the orthogonal propagation mode. The mode separator then separates the output wavelengths by propagation mode.

In U.S. Pat. No. 4,989,199, Rzeszewski discloses an optical multiplexer and demultiplexer using combined code division and wavelength division multiplexing. The multiplexer comprises a plurality of code division multiplexers, each responsive to a plurality of input signals and a plurality of orthogonal code sequences, and a wave division multiplexer for generating an output signal representing the signals of each code division multiplexer carried on a different wavelength. Each code division multiplexer comprises a plurality of phase shifters. The demultiplexer comprises a wavelength selector, a phase shifter and a PIN diode.

The Rzeszewski patent discloses a method to provide photonic network switching by means of combining CDMA and wave division multiplexing (WDM). Rzeszewski's device receives a plurality of signals at a single wavelength at each CDMA multiplexer. The CDMA encoded signals are then superimposed (multiplexed). The superimposed output of each such CDMA block is then "color coded" by a wavelength converter. This color coding allows Rzeszewski to further superimpose the CDMA and WDM tagged signals.

The decoding or "unlocking" is effected by inverting the process. This technique requires coherent optical signals for both the CDMA function (Phase shift keying, PSK) and WDM color code selection (by coherent mixing in the PIN). The CDMA codes are evidently linear (e.g., temporal pulse-position) codes. The size of the resulting network is equal to the number of CDMA codes times the number of wavelengths.

The color coding or WDM usage in the Rzeszewski patent is not special or unique because this function can equally be performed by radio frequency subcarrier modulation (RFSCM) tagging as disclosed by Mathis (see U.S. Pat. No. 4,726,644).

In U.S. Pat. No. 5,175,777, Bottle discloses switches for optical data transmission by which two or more data streams can be combined, separated or switched. Bottle discloses that, instead of buffering, as in time division multiplexing (TDK, wavelength conversions are performed.

In U.S. Pat. No. 5,245,681, Guignard et al. disclose a wavelength multiplexing device comprising a number of sources of continuous light on different wavelengths inputting light to a dendritic structure of controllable optical couplers, which are controlled by a high-speed control circuit. The multiple inputs are reduced to a single output which goes to a modulator. The device makes it possible to select at random all or part of the light sources. Thus Guignard et al. disclose a means of combining P of N wavelengths from N continuous light sources, each at a different wavelength, and modulating them with data prior to transmission via a fiber optic cable. This patent only represents a WDM array, provided that the cable is followed by a WDM demultiplexer.

In U.S. Pat. No. 4,989,937 Mahlein et al. disclose a method of manufacturing light waveguide couplers having at least three gates and a five gate wavelength multiplexer/demultiplexer operating on a beam splitter principle.

In U.S. Pat. No. 5,134,672 Imoto et al. disclose an optical waveguide star coupler including a light propagating core on a substrate. The light propagating core includes a plurality of Y-branching waveguides connected to each other.

In U.S. Pat. No. 5,179,604 Yanagawa et al. disclose a waveguide splitter/coupler including a 2-input/2-output first stage concatenated to 1-input/2-output second and subsequent stages.

In U.S. Pat. No. 5,233,453 Sivarajan et al. disclose a method and apparatus for providing high speed optical tuning. Light is routed to a tree of optical switches interconnected by waveguides. By operating the switches, the light can be directed through a desired optical filter.

In U.S. Pat. No. 5,305,412 Paoli discloses an optical array including optically amplifying waveguides coupled by passive waveguides and splitters to an input beam.

In U.S. Pat. No. 5,325,453 Drissler discloses electrical to optical converter/plugs. This invention includes light waveguides, electrical to optical transformer units and electrical connections contained in a sheath.

In U.S. Pat. No. 5,475,778 Webb discloses an optical coupler for sending and receiving optical signals over optical fibers. The optical coupler converts electrical signals to optical signals and includes circuitry for modifying the format of the electrical signals.

In U.S. Pat. No. D277,583 Kono shows a design for an optical fiber connector.

In U.S. Pat. No. 5,190,466 Kaltschmidt discloses a delay line comprising a spiral groove with taps at intervals along the spiral.

In U.S. Pat. No. 5,143,577 Haas et al. disclose a method of fabricating polymeric channel waveguides.

In U.S. Pat. No. 5,289,454 Mohapatra et al. disclose a method of reading an optical disk which includes switchable waveguides.

In U.S. Pat. No. 5,367,586 Glance et al. disclose a delay line comprising an input wavelength shifter, an input wavelength router a series of unequal length waveguides, an output wavelength router and an output wavelength shifter.

In U.S. Pat. No. 5,414,548 Tachikawa et al. disclose an optical device that can be used as a delay line. It incorporates input and output lines, feedback loops and signal processors.

In U.S. Pat. No. 5,519,803 Shiono et al. disclose an improved optical waveguide.

The paper, "Synthesis and Demonstration of High Speed, Bandwidth Efficient Optical Code Division Multiple Access (CDMA) Tested at 1 Gb/s Throughput", published September, 1994, in IEEE *Photonics Technology Letters*, Vol. 6, p. 1146, describes a novel method of making data streams into matrices which can be broadcast over a network and selectively received. This paper describes the theory of a class of optical CDMA matrix codes and the algorithm for deriving them from (0,1) pulse sequences. The concept can be implemented with planar technology and advanced switching techniques.

Current planar technology was illustrated by Ryo Nagase, Alira Himeno, Masayuki Okuno, Kuniharu Kato, Ken-ichi Yukimatsu, and Masao Kawachi in their article, "Silica-Based 8×8 Optical Matrix Switch Module with Hybrid Integrated Driving Circuits and its System Application", *Journal of Lightwave Technology*, vol. 12, pp. 1631–1638, September. 1994.

Some advanced switching techniques are shown by Janet Lehr Jackel, Matthew Goodman, John Gamelin, W. J. Tomlinson, Jane Baran, C. A. Brackett, Daniel J. Fritz, Robert Hobbs, Karl Kissa, Robert Ade, and David A. Smith in their article "Demonstration of Simultaneous and Independent Switching of 8 Wavelength Channels with 2 nm Spacing using a Wavelength-Dilated Acousto-Optic Switch", LEOS'95, Postdeadline Session, PD1.2, Nov. 1, 1995.

Development of optical circuitry which can greatly increase the throughput and reconfigurability of optical data networks represents a great improvement in the field of high rate data transmission and routing and satisfies a long felt need of the communication engineer.

SUMMARY OF THE INVENTION

The present invention is hybrid wavelength division multiplexing (WDM)/code division multiple access (CDMA) fiber optic encoder and decoder hardware. It provides multiple, concurrent, asynchronous, bursty communication at up to full data rate over a set of network ports. The invention includes a novel wavelength scrambling technique which increases the communications throughput and allows coders and decoders to instantaneously reconfigure their coding channels. This hybrid code approach combines WDM with a form of space/time division multiplexing (matrix codes) applied to each data bit so that up to P channels can be defined and simultaneously used without having the stringent hardware requirements for P different wavelengths or P different time slots or P different space channels (fibers). The reduced hardware requirements allow convenient implementation.

The basic coding idea is to use clusters of very short light pulses to represent digital data. When extended to matrix CDMA codes, pulse widths can be relaxed to pulses in the range Tb/L to Tb, where Tb is the data bit time and L is the number of columns in the CDMA matrix. Shorter pulses are needed if many different codes are active simultaneously. The principle of matrix CDMA coding is to represent each bit of digital data by a cluster of short pulses with specific relative time locations represented by their location in the matrix. This time pattern of short pulses defines the channel. When the complementary time delays are applied to each short pulse in the cluster at the decoder, they correlate to produce a large pulse which is easily detected by the receiver. With proper code design, pulse clusters with other channel code patterns will not correlate with the time delay key of the desired channel. The generalization to WDM/CDMA Hybrid allows the individual short light pulses within a cluster to be distinguished by wavelength as well as time difference. This extends the concept of WDM or CDMA coding by itself Multiple short pulses are necessary for easy detection, but as few as one pulse with one time delay for a given wavelength can provide strong codes. The technique can be extended further by combining other attributes such as spatial coding, using a specific fiber of a multi fiber or ribbon or a specific subcarrier of a set of subcarriers (SCM). These additional attributes multiply the number of potential unique keys thereby increasing the number of channels. Other attributes may include time synchronization, phase shifting, and polarization properties of the transceiver and photonic network fabric. All codes of the aforementioned type can be designed within the framework of CDMA Matrix Code theory.

Optical CDMA and WDM/CDMA Hybrid technology are applicable to switching and routing functions in communication systems requiring multiple, reconfigurable, secure interconnections. Military and commercial applications include: optical backplanes and switches/routers for distributed parallel processing (DPP), advanced telecommunications, sensor fusion, avionics integration, fly-by-light, and distribution of true time delay in a phased array radar beam-forming networks. In WDM/CDMA Hybrids, CDMA matrix coding allows the number of communication channels to be significantly larger than the number of wavelength channels. Also, the use of a commandable scrambling encoder permits re-selection of the communication channel, which provides a convenient form of communications security.

To alleviate multiple access interference (MAI) that can produce a "quality of service" limitation in both optical matrix CDMA and WDM/CDMA Hybrids in high performance computer environments, a modification of this invention has been designed. This modification combines novel coding, modulation, and signal processing schemes which converts the intensity-modulated codes into pseudo-bipolar codes (fast dynamic thresholds). Use of pseudo-bipolar codes reduces MAI and helps ensure a quality of service suitable for computer interconnections with either optical matrix CDMA or WDM/CDMA Hybrids.

An appreciation of the other aims and objectives of the present invention and an understanding of it may be achieved by referring to the accompanying drawings description of a preferred embodiment.

BRIEF DESCRIPTION OF THE DRAWINGS

FIG. 12A is a perspective diagram of a 4×4 crossbar switch mechanized using 1×4 electro mechanical optical switches.

FIG. 12B is a top view of the switch shown in FIG. 12A.

FIG. 12C is a front view of the switch shown in FIG. 12A.

FIG. 14 is a table showing the control law for the 4×4 crossbar switch of FIG. 13.

FIG. 15 is a table illustrating the method of converting a pseudo-orthogonal pulse sequence into a set of pseudo-orthogonal matrices.

DETAILED DESCRIPTION OF THE PREFERRED EMBODIMENT

Figure 1:
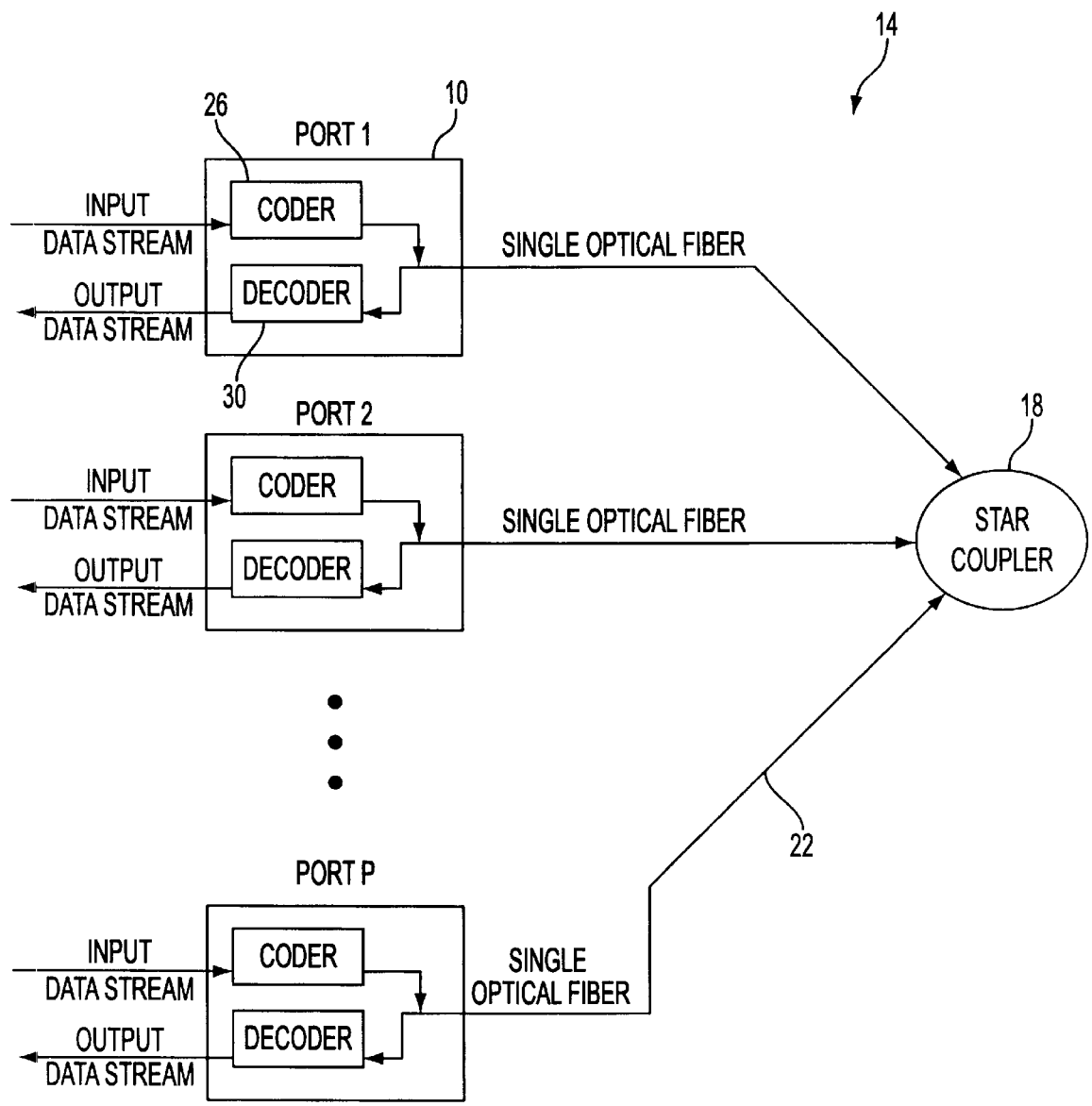
FIG. 1 is a schematic diagram of this invention used with a conventional single fiber per port, optic network.

FIG. 1 illustrates the WDM/CDMA Hybrid invention 10 used with a conventional, single fiber per port, optic network 14. As is usual, the network 14 includes a star coupler 18 and a number, P, of optical fibers 22. Each fiber 22 can be used for simplex or duplex communication. Each fiber 22 terminates at a port where the WDM/CDMA assembly 10 is attached. Each WDM/CDMA assembly 10 comprises a coder 26 and decoder 30. Current technology allows the assembly 10 to be fabricated as a hybrid device or to be assembled from available discrete components. Incoming, electronic data streams flow into the coder portions, while output, electronic data streams flow out of the decoder portions.

FIG. 1 assumes the use of duplex fibers and a duplex star coupler with directional couplers at each port to separate in-coming and out-going signals as is shown. However, when the fibers are short, it is often less costly to avoid the directional couplers and use separate fibers for each direction with the corresponding simplex star coupler. Since in the simplex fiber case there is a pair of simplex fibers for each duplex fiber of the duplex fiber case, both cases are functionally equivalent. Therefore, discussing the WDW/CDMA Hybrid invention 10 in terms of duplex fibers also covers implementations using pairs of simplex fibers.

Figure 2:
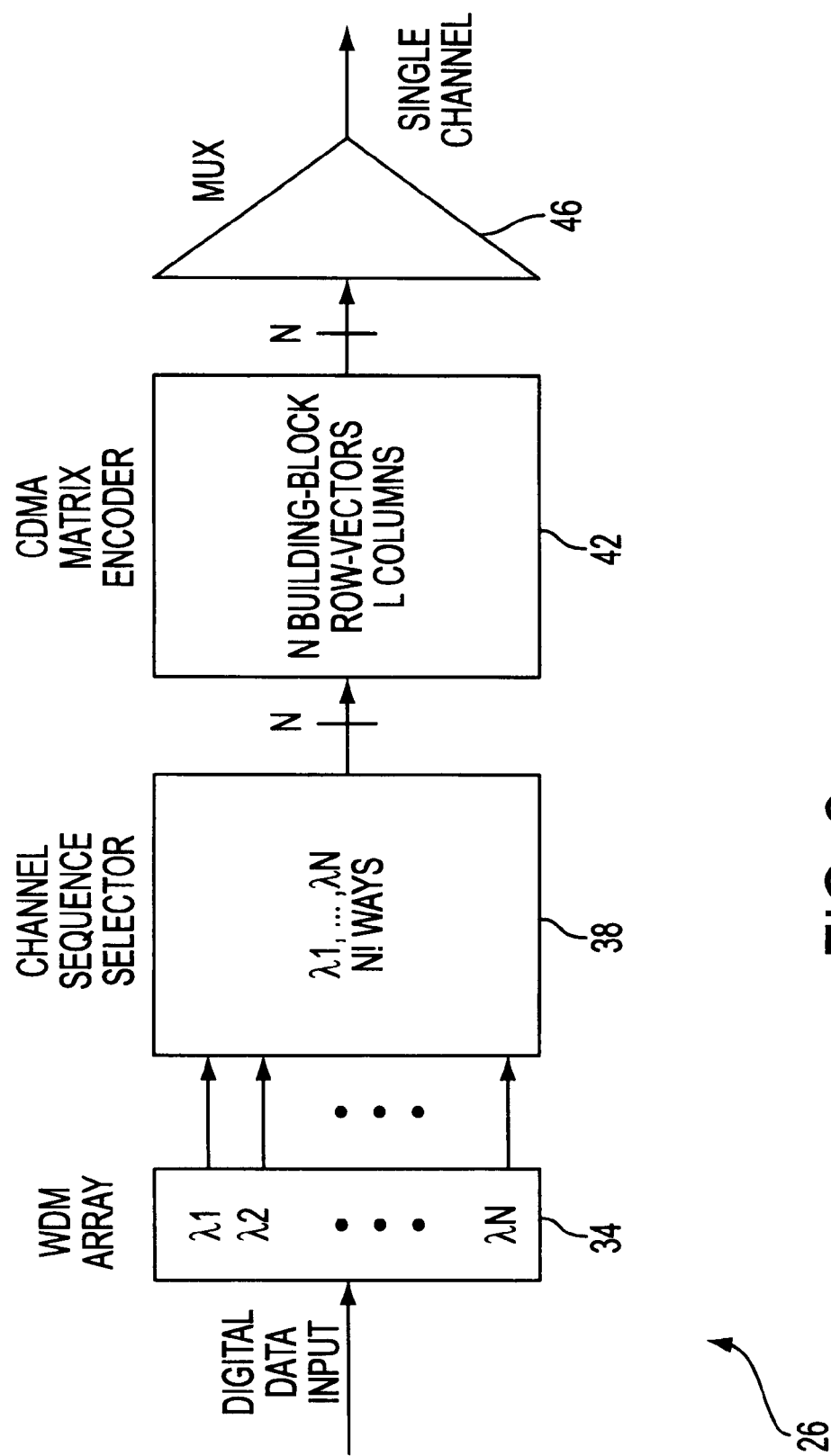
FIG. 2 is a block diagram of the coder portion of this invention.

FIG. 2 illustrates the construction and operation of the coder section 26 of the WDM/CDMA assembly 10. The coder section 26 comprises a WDM array 34, a channel sequence selector 38, a CDMA matrix encoder 42 and a multiplexer (MUX) 46. The incoming, electronic digital data stream (several Gb/s with available current technology) controls or simultaneously pulse modulates N light sources each at a different wavelength $\lambda 1, \lambda 2, \ldots, \lambda N$. The light sources may either be directly modulated or kept continuously active while the light streams are modulated. Each "1" bit on the data stream produces one simultaneous short pulse of each color on the corresponding different optical channels. The absence of a pulse in a data sequence indicates a "0". Of course, the opposite convention can be followed, instead: pulses indicate "0" and their absence could indicate "1".

The channel sequence selector 38 is a commandable optical crossbar switch which interchanges the order of the N optical channels. Since no channels are deleted, there are N! possible orders, each of which is a potential communication channel address. The construction and operation of the channel sequence selector 38 is described in more detail later.

The CDMA matrix encoder 42 splits and time delay encodes each input optical channel (representing a row of the matrix CDMA code) so that time delays correspond to the column positions of 1's in the code matrix. All encoded channels are then combined onto a single output optical fiber by the multiplexer 46. For purposes of this invention, splitting means a fork in a data path. In other words, the function performed is pulse duplication. However, splitting is not needed for rows of the code matrix having only one "1".

The matrix CDMA technique allows a good but long (0, 1) pulse sequence code to be folded into a matrix by assigning segments of the long sequence to columns of the matrix and filling the remainder of the matrix with 0's. The matrix rows can be considered short (0, 1) sequences. Permutations of any member of the matrix code set are also members of the set. In this configuration, limited only by CDMA crosstalk, the channels are pseudo-orthogonal (or optical orthogonal codes, "OOC") because direct detection is used. See "Design of (0,1) Sequence Sets for Pulse Coded Systems", F. Khansefid, H. Taylor, and R. Gagliardi, University of Southern California, Communication Sciences Institute report CSI-88-03-03, Mar. 3, 1988. More details of time delay encoding are given later.

Figure 3:
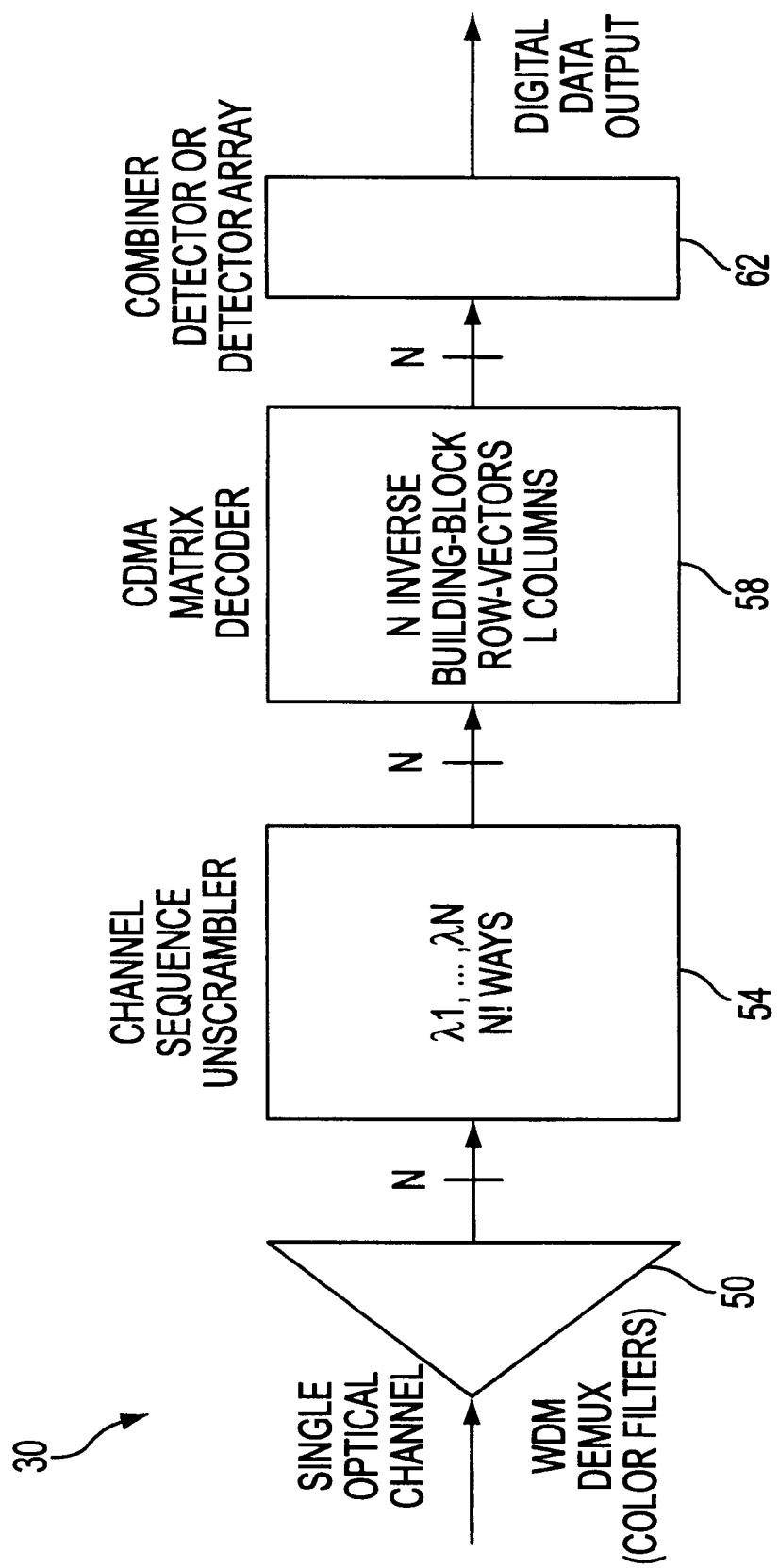
FIG. 3 is a block diagram of the decoder portion of this invention.

FIG. 3 is a block diagram of the decoder portion 30 of this invention. The decoder 30 comprises a WDM demultiplexer 50, a channel sequence unscrambler 54, a CDMA matrix decoder 58 and a combiner detector 62. As is shown in FIG. 3, the incoming optical data is first separated into N different optical channels according to light wavelength by the demultiplexer 50. The channel sequence unscrambler 54 also contains an optical crossbar switch to set the address for the desired channel by reordering that sequence of channels back to the base sequence. All undesired signals when reordered by this crossbar switch come out in a different nonstandard order.

The CDMA matrix decoder 58 splits and time-delay-encodes, with complementary delays of the desired signal encoding, all incoming pulses on each channel. A scaling factor comes from the maximum number of 1's in a row of the CDMA code matrix. This correlates desired signals so that when all the signals are combined in the optical detector 62, strong short pulses are detected for each original "1" in the input bit stream of the desired channel. A phase locked loop controlling a narrow time accept gate on the optical detector can reduce error rates. The absence of a strong short pulse at the expected time EASE is output as a "0". Lack of phase coherency between potentially interfering signals on EE other channels reduces interference on the desired channel. The output of the optical detector 62 is the output bit stream.

Figure 4A:
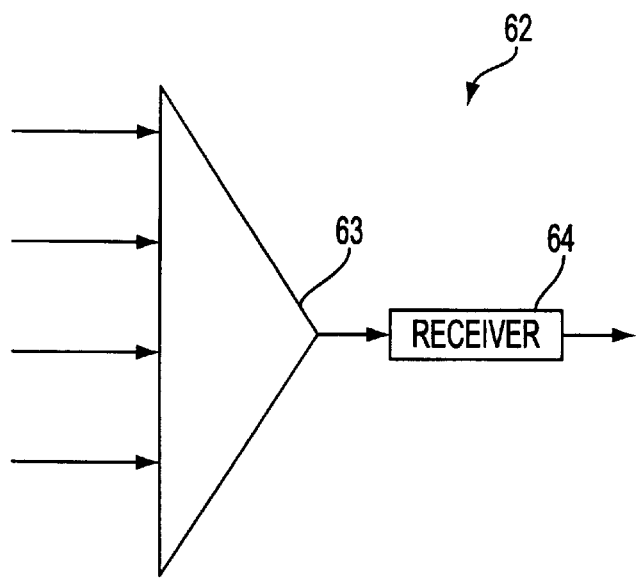
FIG. 4A schematically illustrates an optical combiner followed by a detector.
Figure 4B:
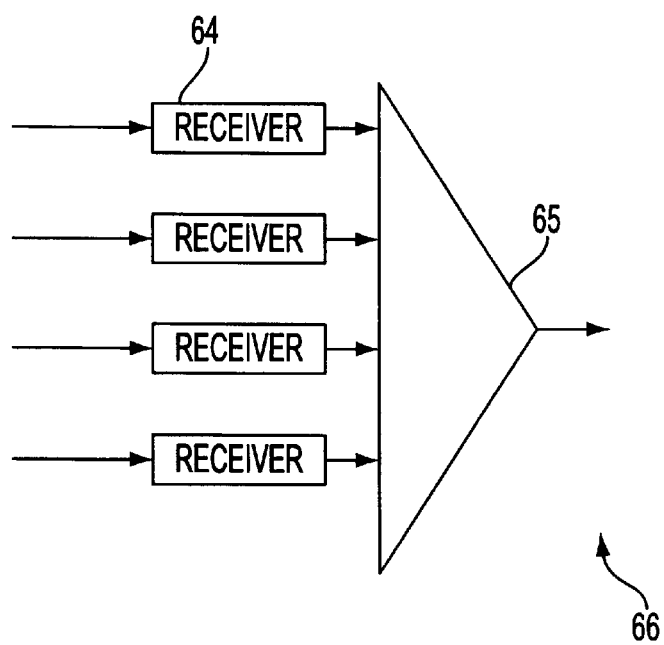
FIG. 4B schematically illustrates a detector array followed by an electronic combiner.

A combiner array 66 may be used in place of the combiner detector 62. The difference between these devices is illustrated in FIG. 4. FIG. 4A illustrates the combiner detector 62 while FIG. 4B illustrates the combiner array 66. The combiner detector 62 has a multi-input, single output, optical coupler 63 followed by a single optical to electrical converter 64. The combiner array 66 has an array of optical to electrical converters 64, one for each optical channel, followed by a multi-input, single output, electronic coupler 65. While there are many optical couplers 63 available, one of particular utility for this invention is the coupler shown in the prior submitted design patent application, docket AM3.

Figure 5:
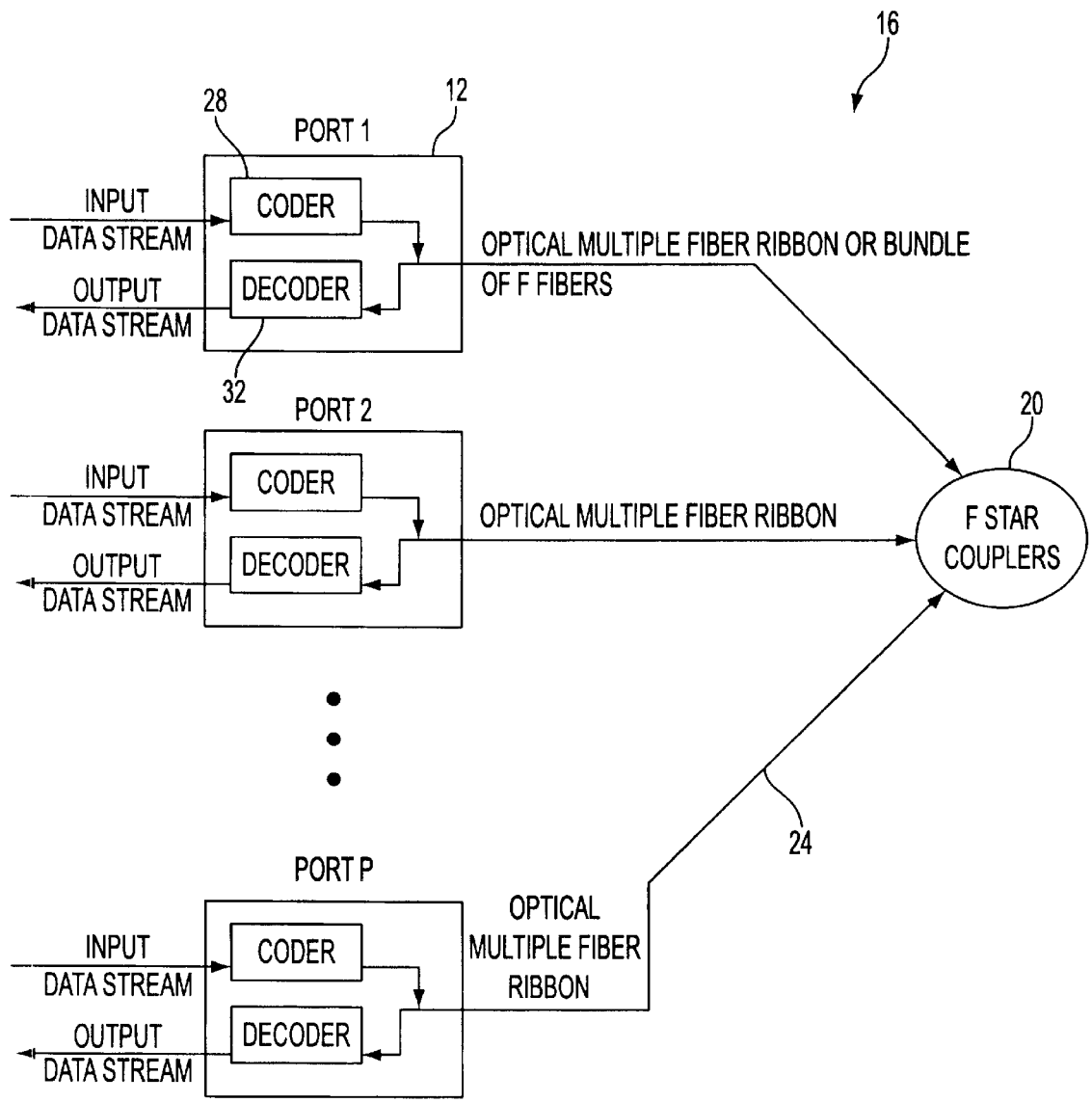
FIG. 5 is a schematic diagram of the expanded version of this invention used with a multiple fiber per port, optic network.

Current technology and cost considerations limit the number of optical wavelengths which are readily available to small numbers like four or eight. Physical effects and cost effectiveness limit the number of wavelengths for large systems to about 30. When larger numbers of ports are needed, the coding space can be efficiently expanded by using multiple optical fibers in combination with multiple wavelengths. FIG. 5 illustrates the WDM/CDMA-expanded-invention 12 used with an extended fiber optic communication network 16 where multiple fiber optic ribbons or other fiber clusters 24 are used for all network interconnections. This time, the network 16 includes a set of F star couplers 20 and the number, P, of duplex optical fiber ribbons 24 each including F active fibers. Each fiber can be used for simplex or duplex communication. Each fiber ribbon 24 terminates at a port where the WDM/CDMA assembly 12 is attached. Each WDM/CDMA assembly unit 12 comprises a multi fiber coder 28 and multi fiber decoder 32. Incoming electronic data streams flow into the coder portions, while output electronic data streams flow out of the decoder portions.

Again, pairs of simplex optical fibers (a total of 2F fibers for each ribbon or fiber cluster) can be used in place of the duplex optical fibers assumed in FIG. 5. Since both cases are functionally equivalent, this description of the WDM/CDMA-expanded-invention 12 covers both types of implementations.

Figure 6:
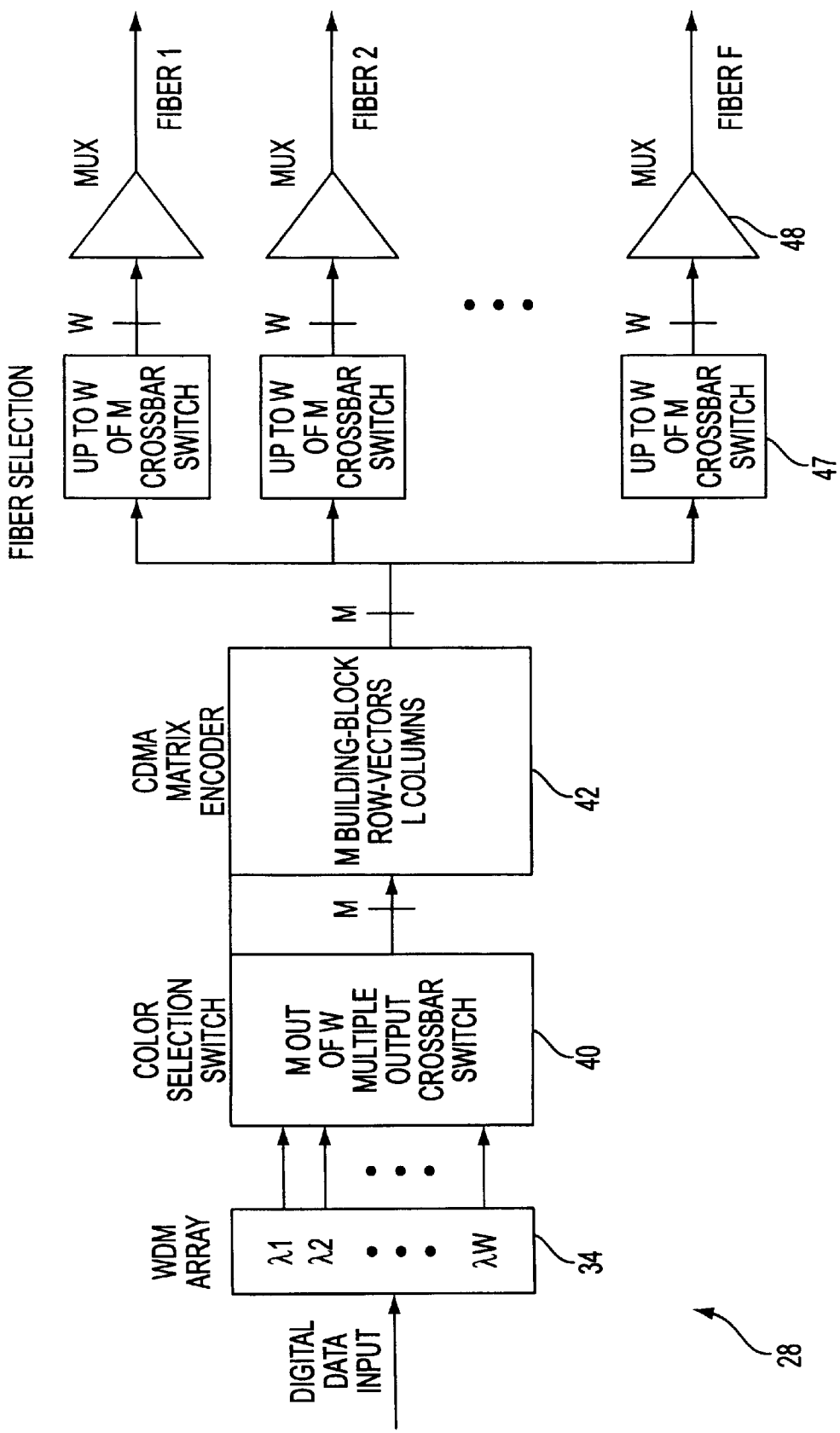
FIG. 6 is a block diagram of the coder portion of this invention used with an extended fiber optic communication network.

FIG. 6 illustrates the construction and operation of the multi fiber coder section 28 of the WDM/CDMA assembly 12. The multi fiber coder section 28 first comprises a WDM array 34 exactly like the WDM array 34 of the single fiber coder except that it may provide more light power and "W" is used to represent the number of different wavelengths so that N can still represent the number of composite physical optical channels. Here N=F×W so that the system is functionally equivalent to one using N different wavelengths. However, for larger N the encoding may be more general. In this case an M channel CDMA matrix time delay encoder 42 is used where M may be equal to or less than N. The color selection switch 40 can be commanded to provide any wavelength to each of the M inputs of the CDMA matrix encoder 42. Up to F inputs may need the same wavelength. Except for size M instead of N the CDMA matrix encoder 42 is the same as that of FIG. 2. The fiber selection switches 47 can be commanded to provide up to W selected outputs from the CDMA matrix encoder 42 to the wavelength multiplexer (MUX) 48 for each fiber. A specific code is specified by defining the CDMA code matrix and the wavelength input and fiber output for each of the M channels of the CDMA matrix encoder 42. Again, the incoming, electronic digital data stream (which may be several Gb/s) controls or modulates the W light sources. The light sources may either be directly modulated or kept continuously active with the light streams being modulated. Each "1" bit on the data stream produces one simultaneous short pulse of each color on different corresponding optical channels.

Code development is a two step process. In the first step M fiber-wavelength channels are selected for CDMA matrix encoding out of the N channels possible. In the second step a specific matrix code with M rows is specified. All the matrix codes used must be pseudo-orthogonal to each other. The number of allowed simultaneous ports, P, is the product of the number of ways of assigning fiber-wavelength channels and the number of different pseudo-orthogonal codes available. M must always be large enough (M=3 or 4) for code self synchronization to allow asynchronous operation of the individual ports.

The fiber-wavelength channel specification problem is to find all combinations of N fiber-wavelengths taken M at a time with at most one overlap between any two combinations. The problem is identical to finding code set sizes of code length N and code weight M with Hamming distance 2(M−1). If two codes overlap on one fiber-wavelength channel, there must be (M−1) channels in each of these codes where they do not overlap. This coding problem has been studied extensively. For example, if N=16 and M=4, code set sizes of about 20 have been found. By reducing to code weight 3 (M=3, three light pulses sent to represent a data bit) the code set size increases to 37, which is many more communication channels than the 16 fiber-wavelength channels. This increase could be obtained without using time delay encoding, but short light pulses (compared to the time per data bit) would be needed to reduce errors from multichannel crosstalk. If three of the overlapping communication channels each happened to have a "1" and also to be in momentary synchronization with the desired channel, they would look like a "1" on the desired channel.

Specification of the time delay encoding can follow the techniques of the simpler single fiber configuration discussed previously. However, other codes are practical when many communication channels are already defined by the combinations of fiber-wavelength channels. Codes where each channel through the CDMA matrix encoder is a single delay are convenient to implement and do not produce additional spurious responses. These are represented by code matrices with one and only one "1" per row. Studies at the University of Southern California have shown that for M=4 the pseudo-orthogonal single pulse per row set size is limited to (2L−1) for matrices of size 4×L. Thus, for N=16, M=4, and L=5 we have P=20×9=180. In this example 180 simultaneous ports are possible. The optical pulse width should be less than $1/(2\times5)=1/10$ of the data bit time. This would be 100 picoseconds for 1 Gb/s data channels.

Figure 7:
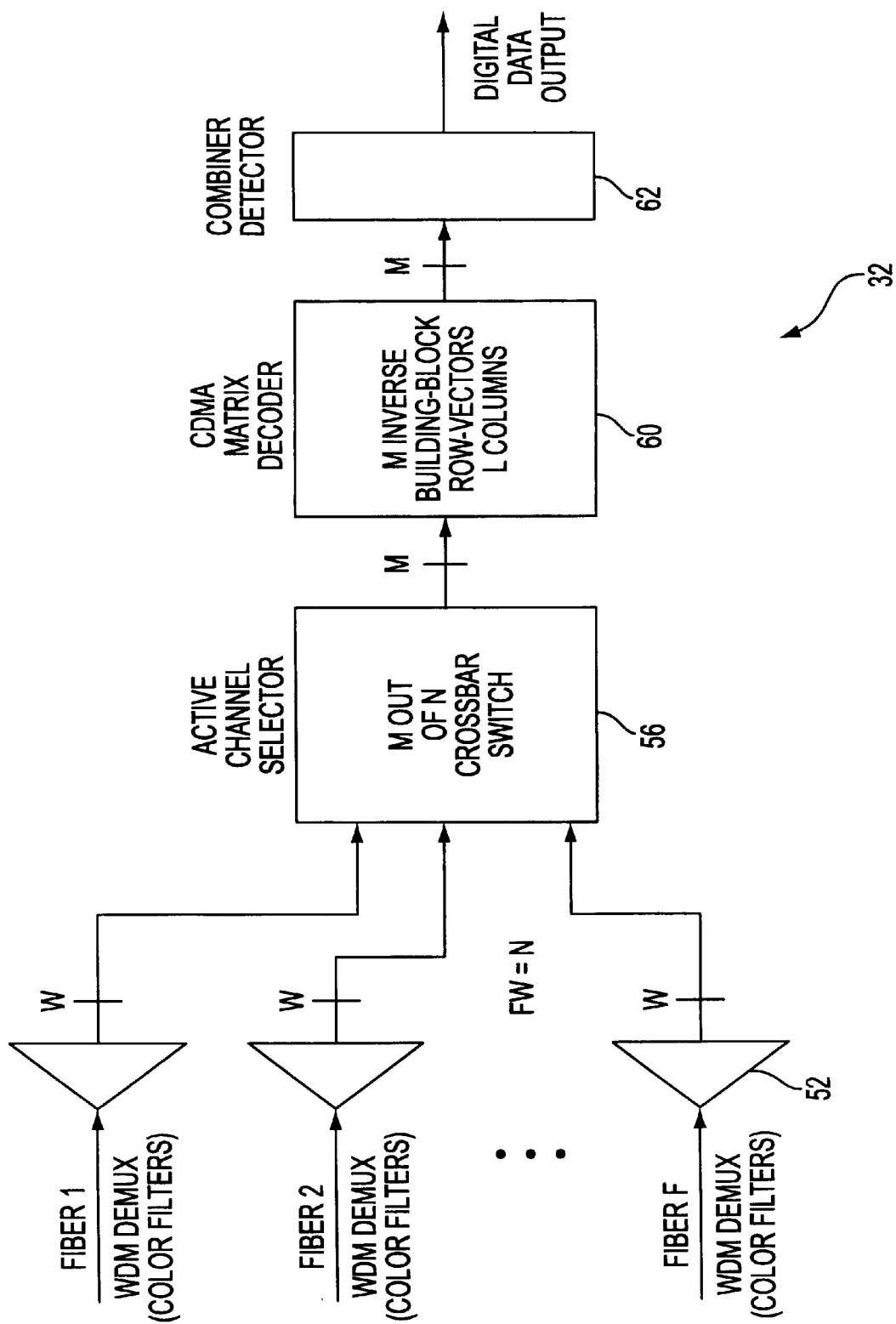
FIG. 7 is a block diagram of the decoder portion of this invention used with an extended fiber optic communication network.

FIG. 7 is a block diagram of the multi fiber decoder portion 32 of this invention. The decoder 32 comprises F wavelength demultiplexers 52, an active channel selector 56, a CDMA matrix decoder 60 and a combiner detector 62. The incoming optical data on each of F fibers is first separated into W different optical channels according to light wavelength by its demultiplexer 52 resulting in a total of N channels from all fibers. The active channel selector 56 contains the functional equivalent of an optical crossbar switch to set part of the data channel address by defining which fiber-wavelengths go to each input of the CDMA matrix decoder 60. The rest of the data channel address is determined by the specific delay code selected for the CDMA matrix decoder 60 from the set of allowable codes. The CDMA matrix decoder 60 is functionally the same as that of FIG. 3 except that M may be less than N and the specific complementary code matrices are often different. This correlates desired signals so that when all the signals are combined in the optical detector 62, strong short pulses are detected for each original "1" in the input bit stream of the desired channel. The combiner detector 62 is exactly the same as that of FIG. 3 and it can be replace by the combiner array 66 of FIG. 4B. Again, a phase locked loop controlling a narrow time accept gate on the optical detector can reduce error rates. The absence of a strong correlation pulse at the expected time is detected as a "0". Lack of time coherency between potentially interfering signals on other channels reduces interference on the desired channel. The output of the optical detector 62 is the output data bit stream.

Figure 8:
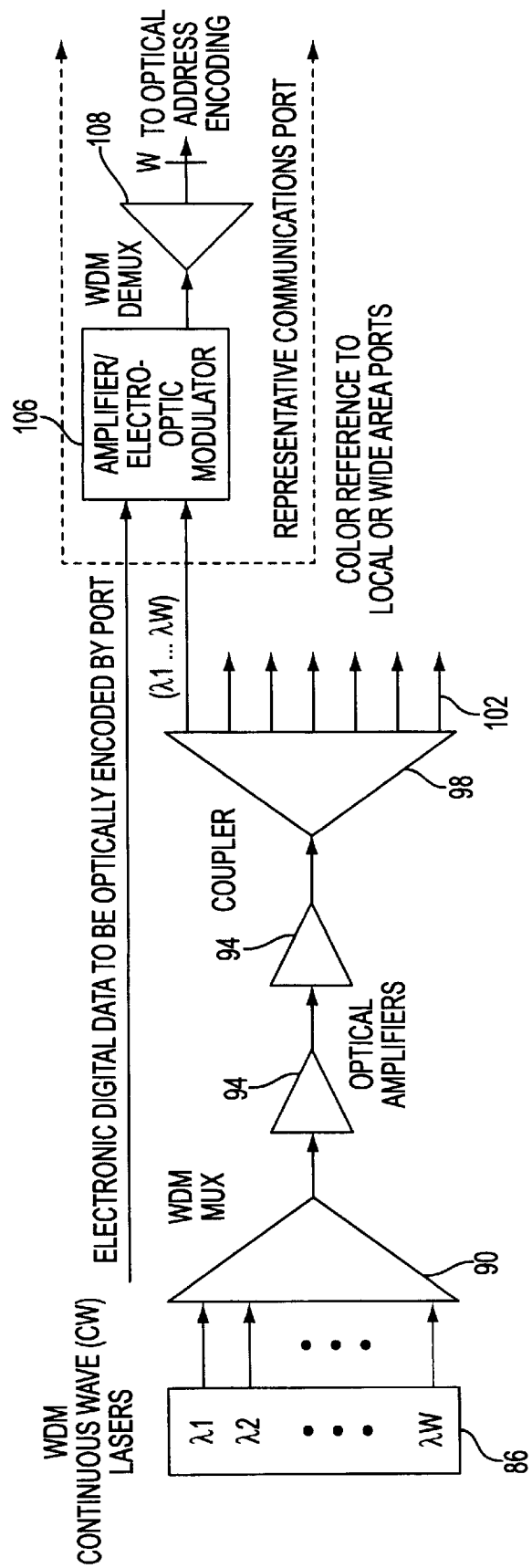
FIG. 8 is a block diagram showing how continuous lasers can be shared.

One approach to providing the array of pulsed stable light sources of different specified wavelengths, the WDM array 34 of FIG. 2 or 6, is to generate each required wavelength with a continuous laser, multiplex these wavelengths into a single channel, pulse on that common channel with a semiconductor optical amplifier/switch or electro-optical modulator, and then demultiplex these pulses with different wavelength into individual optical channels for data channel address encoding. If this approach is followed some components can be shared by groups of local ports or by all the ports in the system. FIG. 8 shows how the continuous lasers can be shared for the cost of an additional fiber to each port. Light at each specified wavelength is provided by the WDM continuous lasers 86, is multiplexed to a single optical channel by the WDM MUX 90, is amplified if necessary by one or more optical amplifiers 94, and is then distributed to all sharing ports by the optical coupler 98 and its distribution fibers 102. At each participating communications port the light is pulsed for each incoming data "1" by the semiconductor optical amplifier/switch 106. These light pulses are then demultiplexed by the WDM DEMUX 108 and provided for data channel address encoding. FIG. 8 shows continuous laser sharing for the multiple fiber network version of this invention 12. Lasers can be shared in the single fiber network version 10 in an analogous manner.

Figure 9:
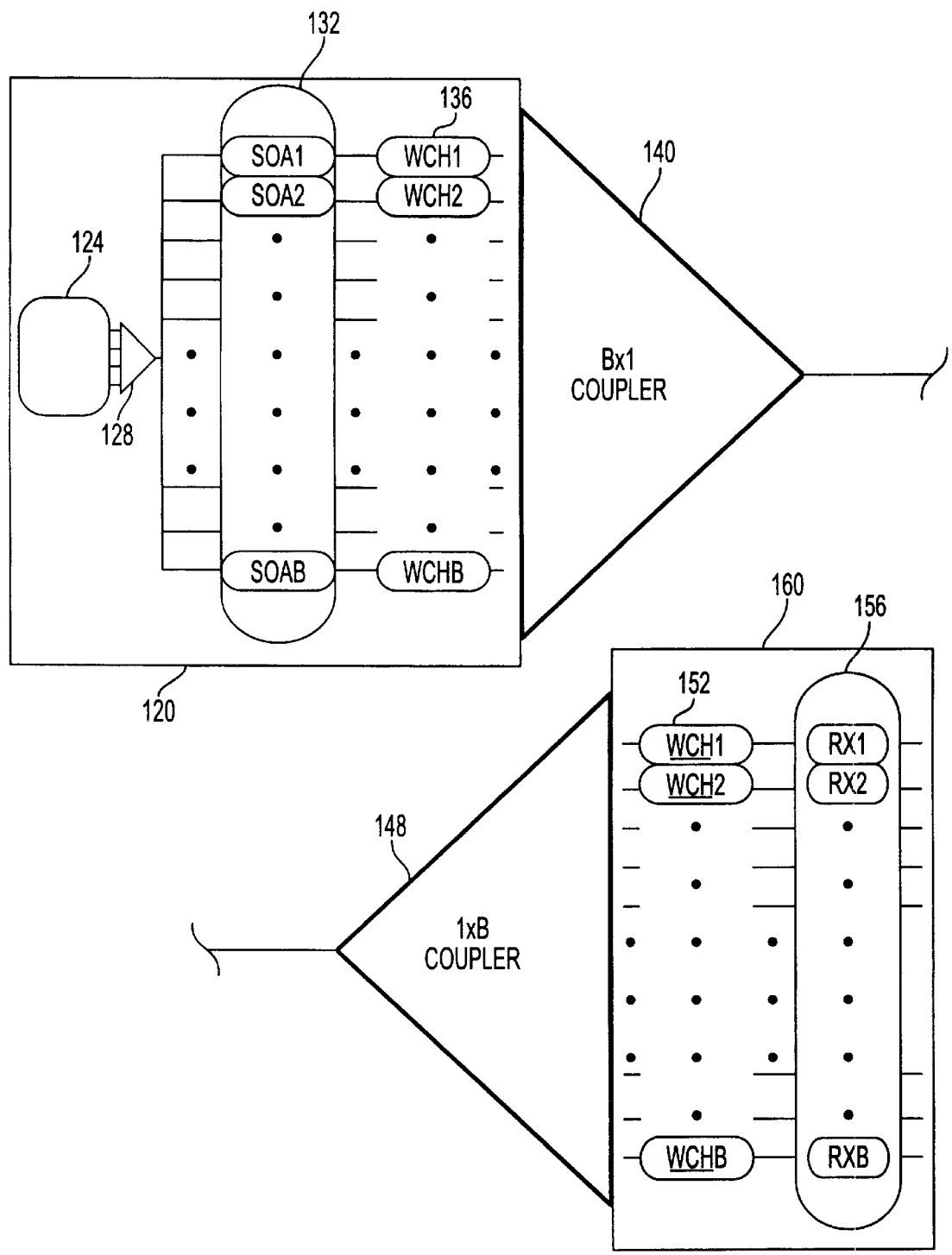
FIG. 9 is a block diagram illustrating a configuration providing for multiple data bits in parallel.

This WDM/CDMA Hybrid coding technique can easily be extended to provide for multiple data bits in parallel when higher data rates are required than can be conveniently provided in single data channels. In FIG. 9 a bit-parallel electro-optical (e/o) interface 120 encodes one optical channel for each of B bits. The e/o interface 120 consists of WDM continuous light sources 124 of W different wavelengths, a WDM multiplexer 128 to put all wavelengths on a single optical channel, B semiconductor amplifier/switches (SOAs) 132, and B WDM/CDMA Hybrid (WCH) encoders 136 all of which develop individual pulse codes for each "1" of the B bits of each input data group. The WCH codes and encoders are the same as those previously discussed. These optical pulse codes are combined into a single fiber or group of fibers by the B to 1 coupler 140. Although only a single pair of ports is shown, by using a fiber network the technique can be expanded to P/B simultaneous bit-parallel ports where P is the total number of different WCH codes available.

At the receiving port the optical input signals are distributed to B optical channels by the 1 to B coupler 148 for decoding by B WCH decoders 152 and corresponding optical pulse receivers (Rx's) 156. These decoders 152 and receivers 156 form the optoelectronic interface 160 for B-bit parallel digital output. Depending upon which components are selected, many different detained configurations are possible for implementing the idea of multi-bit encoding by using different WCH codes for each bit.

High density WCH codes require good amplitude match between all active optical signals for low bit error rates. Star couplers as well as tree architectures allow amplitude matching. Monodirectional communication fibers do, also. If all the signals are going in the same direction along an optical fiber, their losses stay about the same and multi wavelength amplifiers can even be used on such a fiber channel. Fibers in both directions are needed to reach all ports unless very good directional and/or polarization dependent couplers are used.

Figure 10:
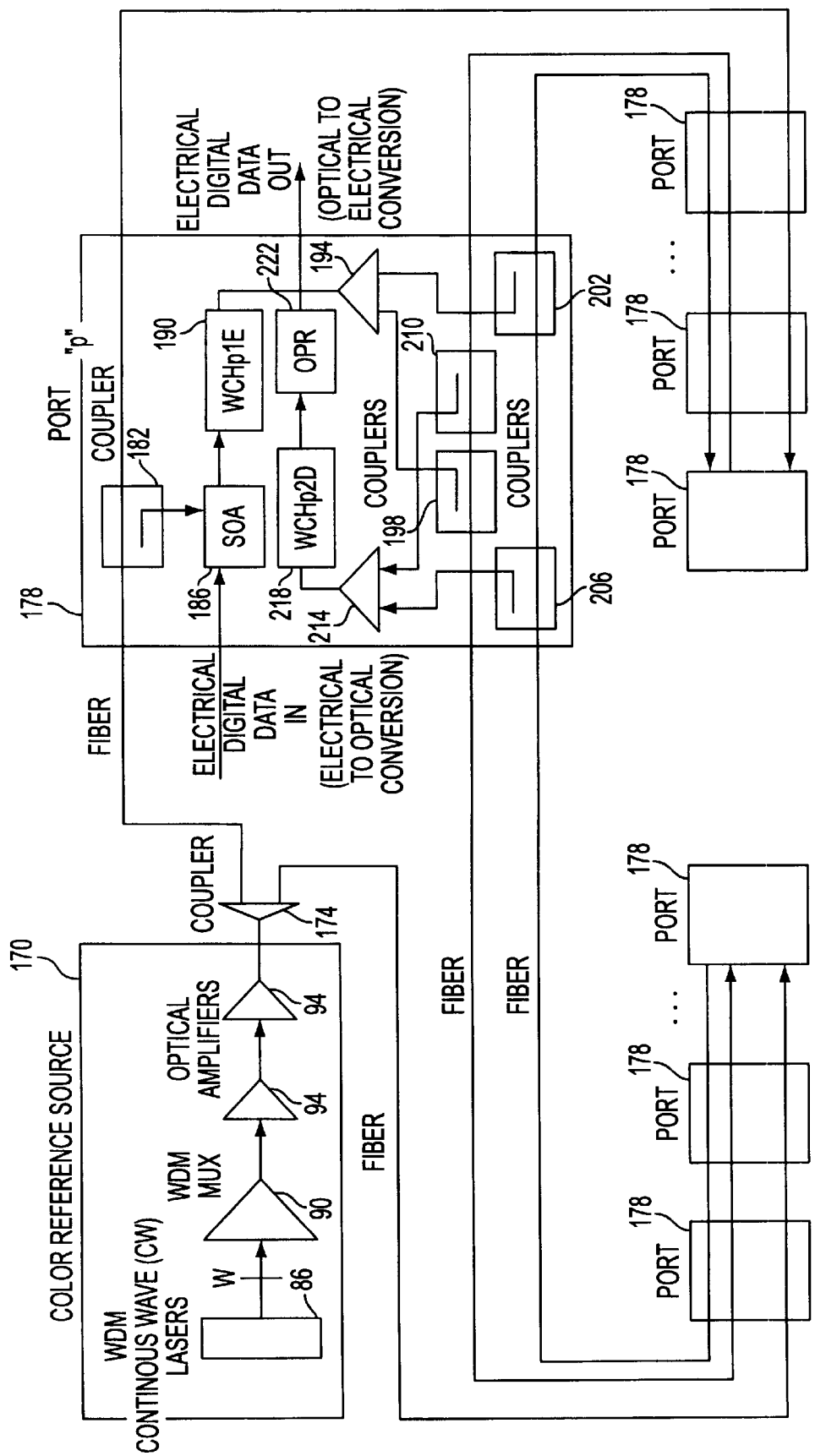
FIG. 10 is a schematic diagram of this invention used with a two fiber two direction communication network.

Such a communications network is shown in FIG. 10. It might also be called a broken ring network: i.e. a ring with one link missing. Single fibers are shown for data in each direction, but the concept is also valid using fiber ribbons or multi fiber bundles in each direction for greater total throughput. As was also shown in FIG. 8, continuous lasers are shared in the color reference source 170. Light at each specified wavelength is provided by the WDM continuous lasers 86, is multiplexed to a single optical channel by the WDM MUX 90, is amplified if necessary by one or more optical amplifiers 94, and is then distributed to all sharing ports by the coupler 174 which can divide the power proportionally for the numbers of ports on each side of this common source 170. Within each port 178 needed color reference power is tapped off of the reference distribution fiber by partial coupler 182. This light signal is pulsed by digital input data and amplified by the semiconductor optical amplifier/switch 186 and then encoded with WDM/CDMA Hybrid (WCH code for the data destination address in the encoder 190. Coupler 194 or partial couplers 198 and 202 must be adjustable to set the amplitude of the new signal to that of other signals at that point on each of the two fibers in different directions. Signal levels will normally be different in each direction, but they should only change when the physical network configuration is changed. Individual signal levels should not be a function of network activity, although the composite energy on a fiber does depend upon the number of ports active. This is useful in setting decision thresholds for the multi-access case.

Optical code reception begins by signals being sampled from the two directions by partial couplers 206 and 210. The directional signals are combined by coupler 214. Adjustment is necessary to balance signal amplitudes from the two directions. The code for data from the desired point of origin is decoded by the WCH Decoder 218, and the data is detected by optical pulse receiver 222. Full duplex operation on a single code channel is not allowed unless couplers 194 and 214 are replaced by switches or decoupled by means of, e.g., polarization or coherence effects, and slightly more complex addressing is employed. Information on the directions to desired ports is needed.

All of the configurations use some type of optical crossbar switch. It should be recalled that the function of the switches is to change the virtual channel addresses, so that they need not switch at the data rate, but only at the message or packet rate. This expands the number of candidate switch technologies which can be used. For some applications, switching in less than one millisecond may be required. Commandable code switching at a prescribed rate can also be used as a form of data security and message protection.

Switching networks may either be an assembly of currently manufactured switching components or a more tightly integrated physical hybrid. Consider the assembly of components. Example components are 1×2 optical switches, 2×2 optical switches, and 1×4 optical switches. All are available from various vendors using optical switch technologies ranging from opto-mechanical (e.g., DiCon and LighTech), through thermo-optic (PIRI and Akzo-Nobel), to magneto-optic (FDK, using Faraday rotation magneto-optic technology).

Figure 11:
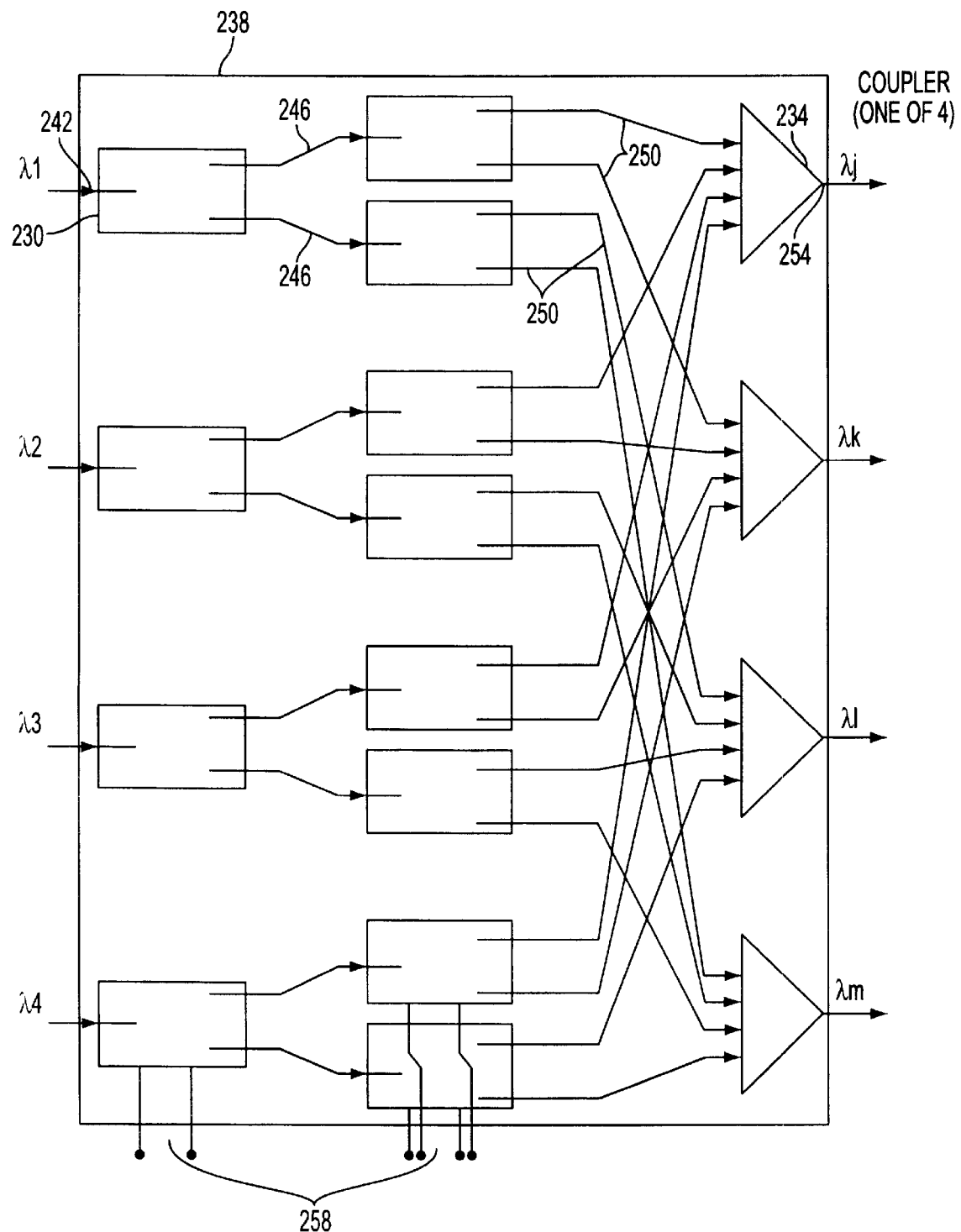
FIG. 11 is a block diagram of a 4×4 crossbar switch mechanized using 1×2 optical switches.

For example, consider the channel sequence selector 38 of FIG. 2 and the channel sequence unscrambler 54 of FIG. 3 both for N=4, four different wavelengths and four corresponding optical channels. These are 4×4 optical crossbar switches. FIG. 11 illustrates a switch configuration using 1×2 optical switches. In this example the twelve 1×2 switches 230 and four 4×1 optical couplers 234 are mounted on a planar substrate 238. Planar optical waveguides 242, 246, 250, and 254 which are formed on the substrate interconnect the optical components. The layout must be controlled so that lengths of waveguides at each level of optical switching are equalized so that the time delay for any optical crossbar switch input to any optical output is always the same. This is necessary to an accuracy of much less than the smallest time increment used for time delay coding (about 10% of the chip time Tc, which is often the optical pulse width). On substrate 238 the waveguides 250 between switches 230 and couplers 234 must all be about the same length. Electrical interfaces 258 to control all of the 1×2 switches 230 are also included. For clarity, not all electrical interfaces 258 are shown in FIG. 11. For each crossbar switch state needed, electrical commands are issued to direct each optical input to its desired output waveguide, inputs 242 and outputs 246 for the first level of switches 230 and inputs 246 and outputs 250 for the second level of switches 230.

Where switching times as long as 25 msec. are acceptable, electrically driven mirrors 268 can be used for optical switching. FIG. 12 illustrates a configuration for a 4×4 crossbar switch assembled from four 1×4 electro mechanical optical switches 270 and four optical couplers 274. In this case a compact assembly is obtained by stacking the packaged components. Direct fiber optic connections between switches and couplers are possible when the 1×4 switches 270 are stacked horizontally and the flat couplers 274 are vertical as shown. Optical input and output to the crossbar switch assembly is by optical fibers.

Figure 13:
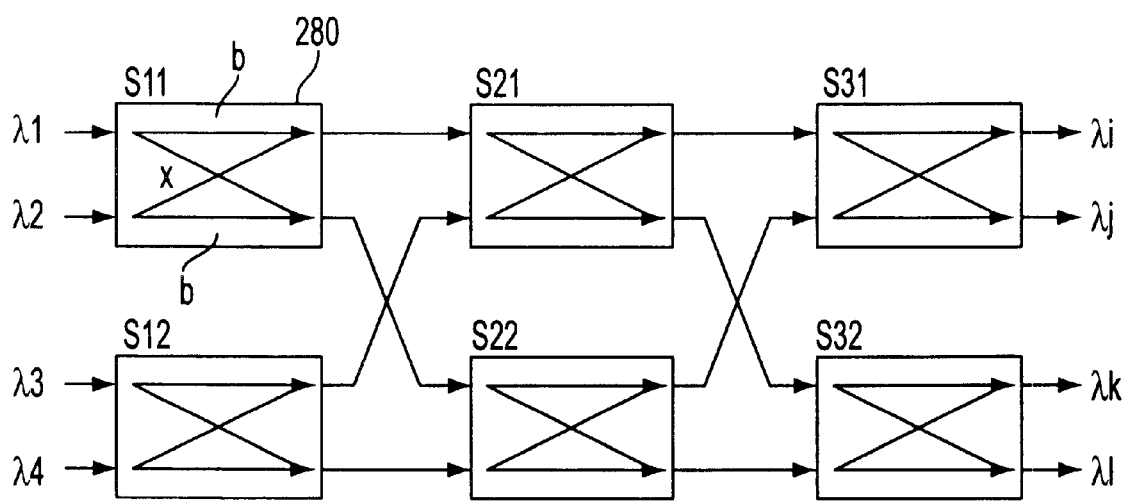
FIG. 13 is a block diagram of a 4×4 crossbar switch mechanized using 2×2 optical switches.

In another example FIG. 13 illustrates a configuration for a 4×4 crossbar switch using six 2×2 switches 280. These switches have two commandable states, the bar state (b) where inputs go to corresponding outputs and the cross (x) state where inputs go to opposite outputs. The time delays must be the same for each state. As with all configurations, the optical interconnect delays must also be equalized at each stage. A corresponding control law is shown in the table of FIG. 14. The required switch commands (bar or cross) for each of the six 2×2 switches 280 are specified for each of the 4!=24 possible orderings of the full 4×4 crossbar switch.

The requirement for any set of valid CDMA codes is that each code in the set specifies time delays to convert each data bit into a cluster of pulses characterized for that code by the known pulse time differences. When complementary time delays are applied to a received pulse cluster, all of the pulses will be correlated. Other codes of the set must be uncorrelated in that the complementary time delays applied to any nonmatching coded pulse cluster from the set result in reduced pulse coincidences. Any set of codes meeting these criteria may be used. When time delays are conditioned on pulse attributes such as wavelength, specific pulses within a cluster are identified by their attributes and specific time delays can be associated with specific pulses or subgroups of pulses. Several computer aided techniques, such as organized searches aided by matrix CDMA theory have been used for finding such CDMA code sets.

For example, matrix CDMA is a method of representing codes conditioned on attributes where the codes are readily synthesized from the well defined and documented pseudo-orthogonal (0,1) pulse sequences. The method of synthesis of the matrix codes is as follows: (a) a member of a set of r pseudo-orthogonal (0,1) pulse sequences is partitioned into segments of length s where s may be selected to be a power of two for convenience of implementation; (b) zeroes are appended to the (0,1) pulse sequence so that the augmented sequence is an integral (preferably power of two) multiple of s; (c) the segments of length s are arranged as columns of a matrix; (d) the rows of the resulting matrix are permuted to generate up to (s−1) additional matrices; each of these permuted matrices are pseudo-orthogonal to each other; (e) the process is repeated for all r original (0,1) pulse sequences. The net result is a set of rxs pseudo-orthogonal matrices. This property is the source of the large number of addresses which can be generated by this CDMA scheme. The resulting matrices have a code length approximately s times shorter than the initial linear codes from which they were originated. This property is the source of the bandwidth efficiency of the resulting matrices (the code length can be made of the order of unity). Furthermore, the resulting set of rxs matrices have no more combined crosstalk than the initial set of r linear codes. Thus, the concurrent communication has relatively less pseudo-noise clutter. In addition, if implemented with fiber optic delay lines, the matrix CDMA network has 20 log(s) less loss, in dB, than the corresponding linear CDMA network implemented with fiber optic delay lines.

FIG. 15 shows an example of a matrix set created from one pseudo-orthogonal pulse sequence. This special sequence is called a Golomb Ruler, interpreted as a (0,1) pulse sequence which is label L(1,7). (See H. Taylor and S. Golomb, "Rulers—Part 1", University of Southern California ES Report CSI-85-05-01, May, 1985.) The Figure shows conversion of the sequence into a set of four pseudo-orthogonal matrices of four rows (s=4) and eight columns (matrix code length=8). The Figure shows that the matrix set can be described in terms of seven "building block" row vectors, Vi, i=1 . . . 7. The four matrices generated from a single linear sequence are labeled PiM, i=0 . . . 3, where Pi symbolizes the ith permutation of M=M(r,w,s)=M(1,7,4). In this compact notation, r symbolizes the initial number of (0,1) pulse sequences, w denotes their code weight (the number of 1's in the code sequence), and s the number of rows in the synthesized matrices.

A scaling factor comes from the maximum number of 1's in a row of the CDMA code matrix. Each input is divided into the number of subchannels equal to this scaling factor. For each row of the matrix a time delay proportional to the column number of each "1" in that row is provided on a corresponding subchannel. Light from all active (those with delays) subchannels is combined for the encoded output.

Figure 16:
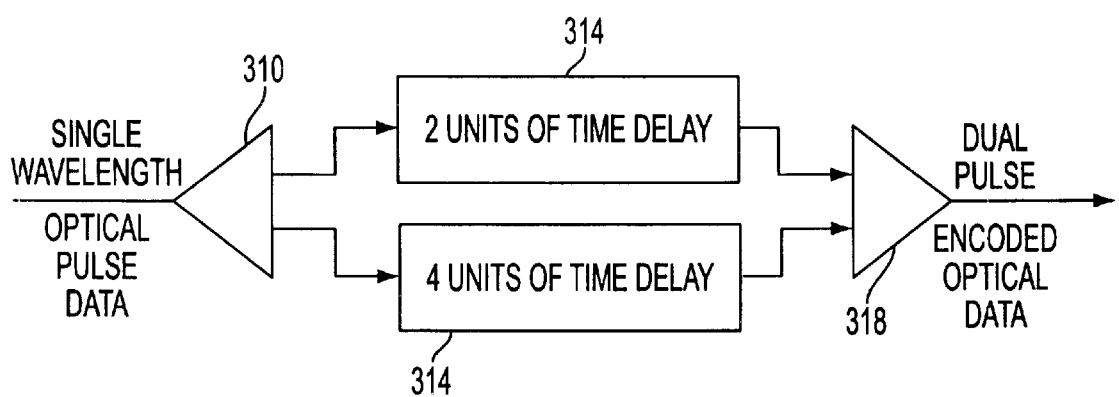
FIG. 16 is a block diagram of a matrix row time difference encoder.

FIG. 16 shows a block diagram of a matrix row encoder. The V2 rows from FIG. 15 are used as the example. The row encoder consists of a 1×2 optical coupler 310, two optical delay paths 314, and a 2×1 optical coupler 318. The unit of delay is the optical pulse width. Each data pulse is split into two pulses by the coupler 310. These pulses are given the proper relative time delay by the delay paths 314 and then combined onto a single channel by the coupler 318. In general, one delay path is needed for each "1" in a matrix row. The number of delay units depends upon the matrix column of the "1". Even a single delay must be gain adjusted so that the single pulse has the same amplitude as pulses from rows with multiple pulses.

Figure 17:
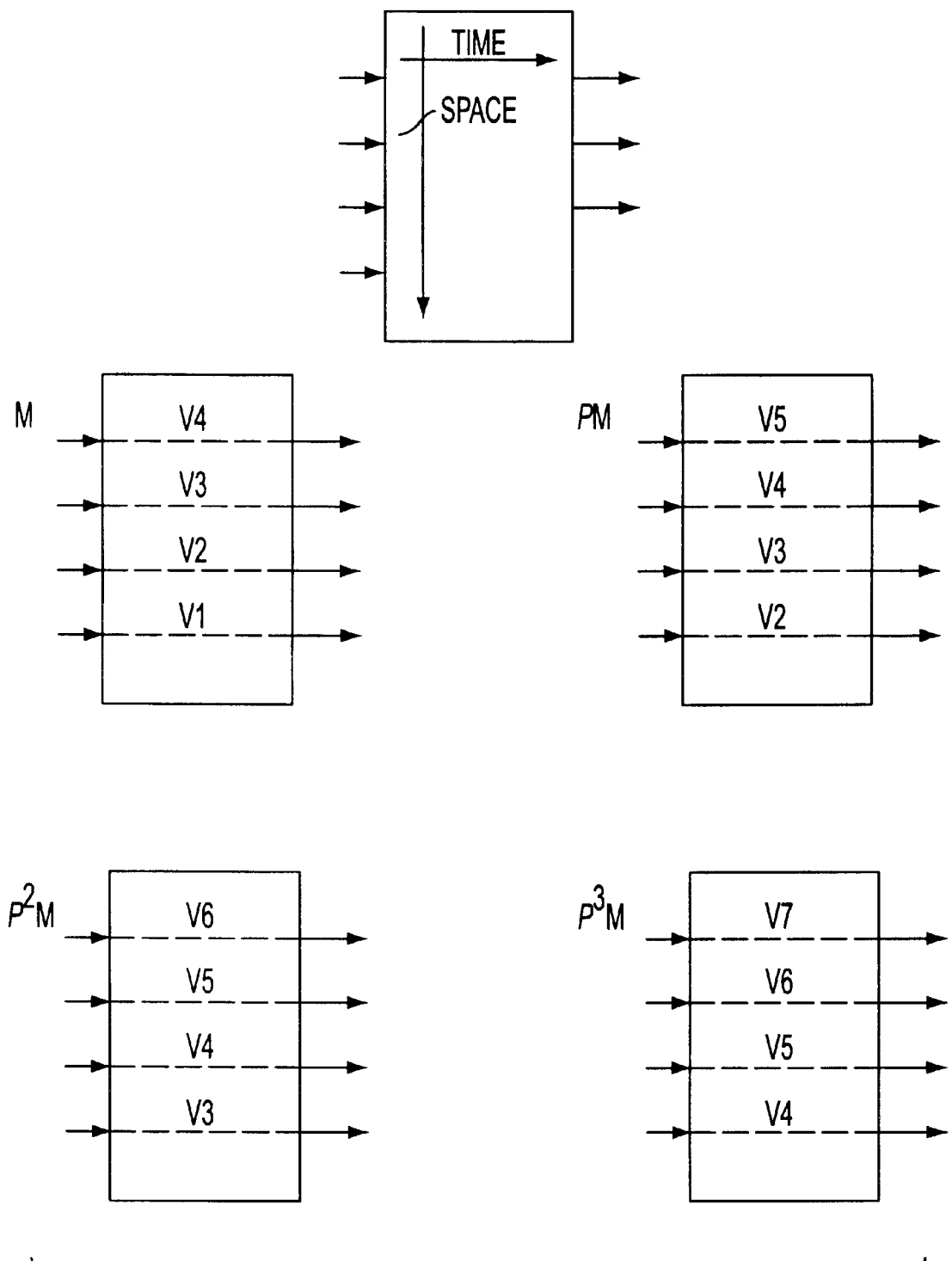
FIG. 17 is a diagram illustrating the space time encoding resulting from matrix encoding.

The process of physically implementing the codes, and of encoding data with multi-attributes, is based on identifying the rows of the matrix with the wavelength or other attribute or combination of attributes and the columns with the time domain as shown in FIG. 17. The matrix and vector identifying numbers are the same as those shown on FIG. 15. The wavelength-time matrices are a special case of WDM/CDMA Hybrids in which the attributes used are wavelength and temporal coding. Similarly, WDM/CDMA Hybrids may be extended to space-wavelength-time matrices in which the additional attributes are space and wavelength, where space refers to a domain of alternate parallel communication fibers.

Figure 18:
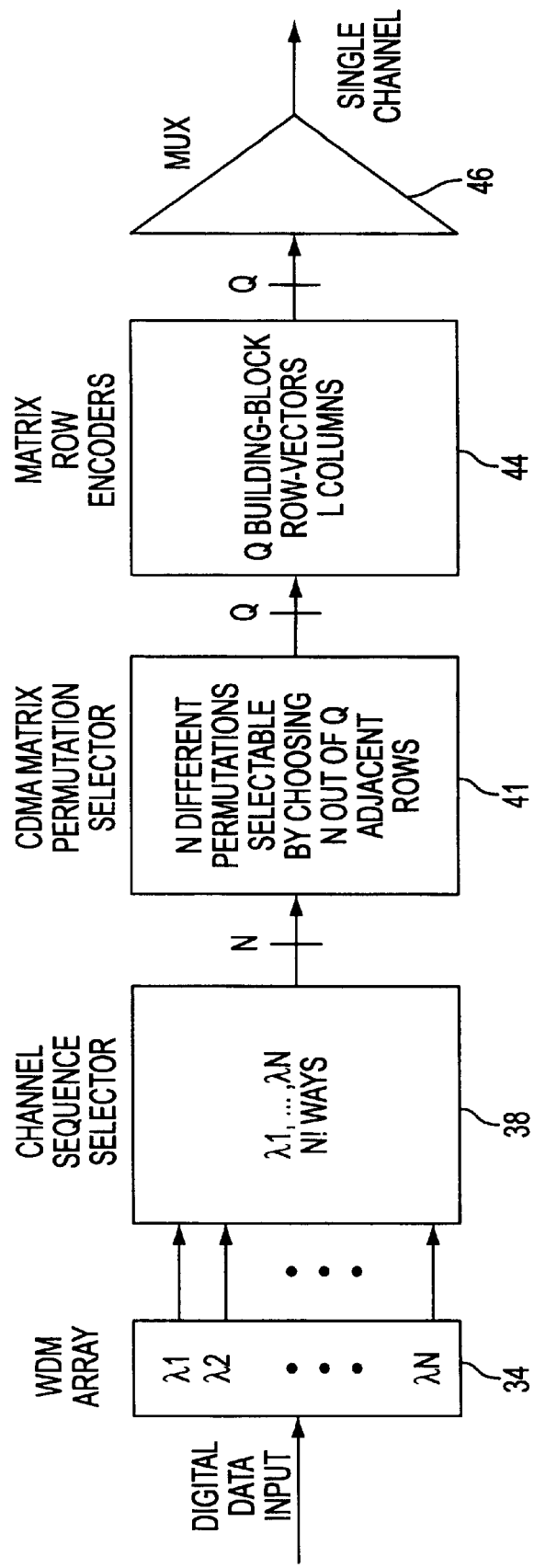
FIG. 18 is a block diagram of the coder portion of this invention using selectable matrix row encoders.

Many techniques can be used to physically select a specific CDMA code from an available set. For the example of the set of four matrices cited previously, the optical time delay functions of each of the seven row vectors could each be implemented individually. More generally, the CDMA matrix encoder 42 of FIG. 2 is expanded into a CDMA matrix permutation selector 41 and the matrix row encoders 44 as shown in FIG. 18. The optical switch 41 selects any of the allowed N of the Q optical pathways or fibers going to the set of Q matrix row encoders 44 where Q=2N−1. All of the pulses delayed by the matrix row encoders 44 are combined into a single channel by the multiplexer 46. The optical switches of the channel sequence selector 38 and the permutation selector 41 can often be efficiently combined. An integrated device for performing all these functions is shown on prior submitted design patent application, docket AM6.

Figure 19:
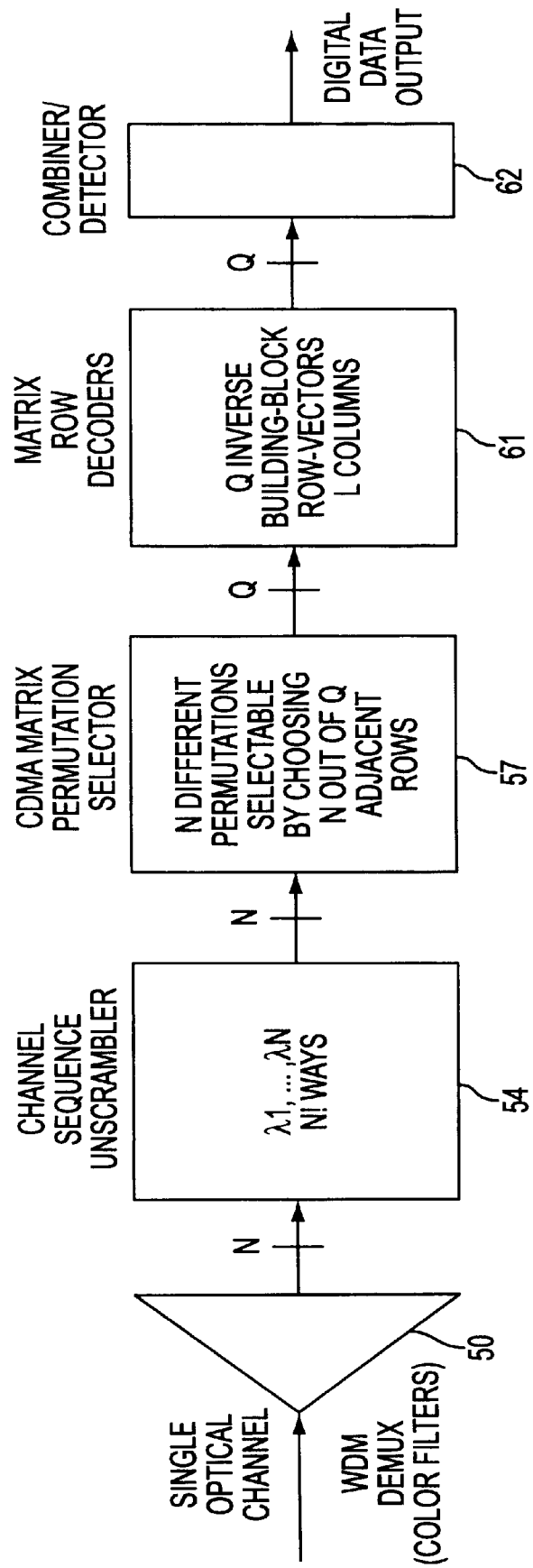
FIG. 19 is a block diagram of the decoder portion of this invention using selectable matrix row decoders.

Similar expansions are made to the decoder of FIG. 5 as shown in FIG. 19. The CDMA matrix decoder 58 is expanded into the CDMA matrix Permutation Selector 57 and the matrix row decoder 61. The permutation selector 57 is the same as the permutation selector 41 of FIG. 18. The row decoder 61 is the same as the row encoder 44 of FIG. 18 except that complementary delay times are used All code pulse delay times plus their corresponding complements always equal the same constant time delay. The integrated device shown on prior submitted design patent application, docket AM6, can likewise be used in the decoder portion shown on FIG. 19.

Figure 20:
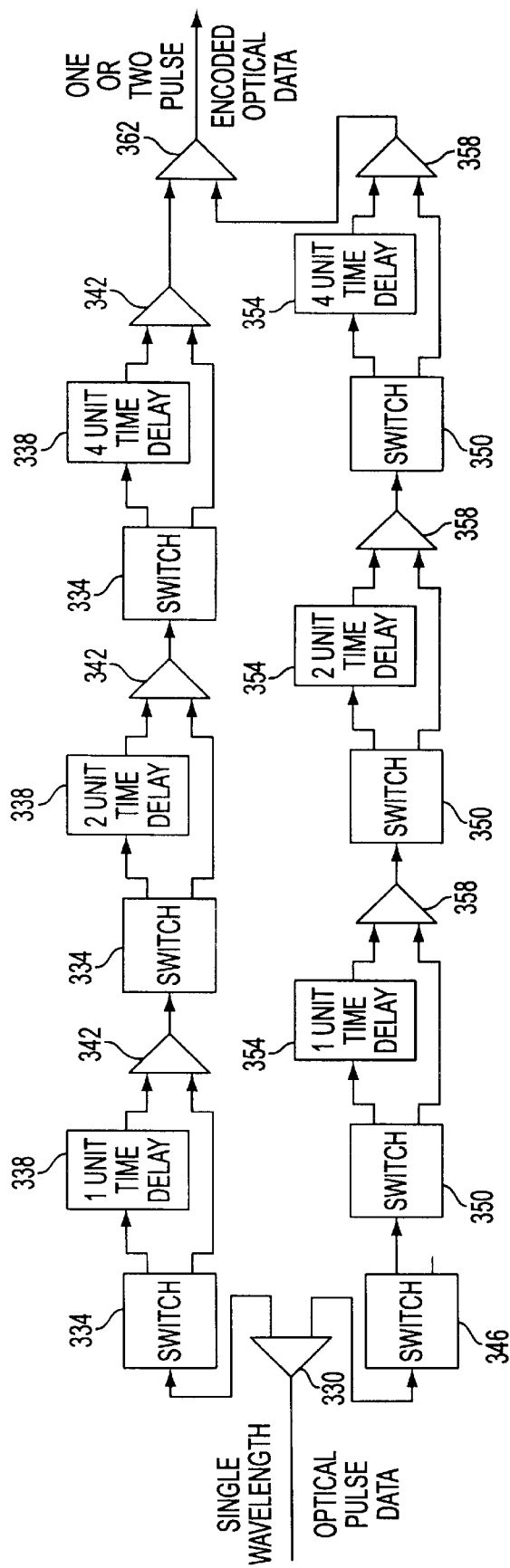
FIG. 20 is a block diagram of a commandable universal matrix row encoder-decoder.

An alternative CDMA code selection technique is to use N commandable universal matrix row encoder-decoders in place of the CDMA matrix encoder 42 of FIG. 2 and the CDMA matrix decoder 58 of FIG. 3. FIG. 20 shows an example of a single comnmandable universal matrix row encoder-decoder. It starts with a 1×2 optical coupler 330 which splits incoming pulses into two paths. The top path has three electrically controlled optical delay paths each consisting of a 1×2 optical switch 334, an optical delay path 338 of the specified units longer than the direct path, and a 2×1 optical coupler 342 which passes either the direct or delayed optical pulses. The unit of delay is the width of the optical pulses. Any delay from 0 through 7 units may be commanded using the three switches. The lower path is an optional delay path which is enabled by the 1×2 optical switch 346 and has delays matched to those of the top path. It has commandable delay provided by optical switches 350, optical delay paths 354, and optical couplers 358. The two paths are combined with the 2×1 optical coupler 362. All the commandable universal matrix row encoder-decoders must have matched delays. If the matrices are larger, more paths and more commandable delay paths per path can be provided as needed. When the N commandable universal matrix row encoder-decoders are used, the channel sequence selector 38 as shown on FIG. 2 and the channel sequence unscrambler 54 as shown on FIG. 3 are not needed because the sequences can be included in the commands to the row encoder-decoders.

Information is encoded as clusters of non-overlapping pulses which coincide when decoded. However, many or all of the un-decoded pulse clusters from other signals on the network are still present at the detector. These other pulses have the potential to interfere. Consider the original single fiber example with four wavelengths and four different matrix CDMA codes. These codes need eight time slots and will spread over 15 time slots during decoding for some of the signals which do not match. Assume that the code pulse width is 1/16 of the data bit time which would be one nanosecond for one gigabit/sec. data rates. The code uses 7 short pulses to represent each "1" of data. After decoding, these seven pulses coincide to give a single short pulse seven times larger. There are four wavelength channels in the complete decoder. Any single signal will have two short pulses in each of three wavelength channels and one short pulse in the other wavelength channel. Delay decoding will double short pulses in three wavelength channel but only delay the pulses in the other channel. The channel without doubling may get either one or two pulses from a specific nonmatching signal. Therefore, each nonmatching signal results in 12+1=13 or 8+2+2=12 short pulses. To simplify the estimates, assume 12 in all cases since 12 occurs 75% of the time. All interfering signals have randomized reference times.

If no more than four different wavelength orderings are used, the wavelengths may be different in every position, such as λ1, λ2, λ3, λ4; λ4, λ1, λ2, λ3; λ3, λ4, λ1, λ2; λ2, λ3, λ4, λ1. For this we have 4 (orders)×4 (time delay codes)=16 potential simultaneous communication channels.

Cross-channel interference at point of signal detection =

$$\frac{(16-1) \text{ (interferences)} \times 12 \text{ (pulses per interference)}}{16 \text{ (pulse width ratio)}} =$$

11 1/4 independent channel pulses

The interfering pulses are data dependent from 12 or more independent channels. If 0's and 1's are equally likely, a threshold could be set at ½(11.25+7)=9.125 pulses However, there would be errors whenever the correct signal was "0" and at least 9 of the 11 interfering channels all had "1" or the correct signal was "1" and at least 9 of the 11 interfering channels all had "0".

This limitation, due to the interchannel interference, is more serious for data communications in high performance computer environments than for voice or imagery communications, where there is a certain amount of natural redundancy in the data and thus a natural tolerance to some errors. However, if the threshold is made a function of the immediate interference environment, part of the effect of interference data states can be canceled out. Threshold sensing windows both before and after (relative time) the point of data detection can sense the best interference reference. For seven pulse codes adding 3.5 to this value makes a good signal detection threshold. The windows can be implemented with delay lines. Such a fast dynamic threshold also compensates for changes in the network activity level. Error rates can also be reduced by increasing the pulse width ratio, which requires using narrower light pulses. While there are many optical delay lines available, one of particular utility for this invention is that shown in the prior submitted design patent application, docket AM5.

Figure 21:
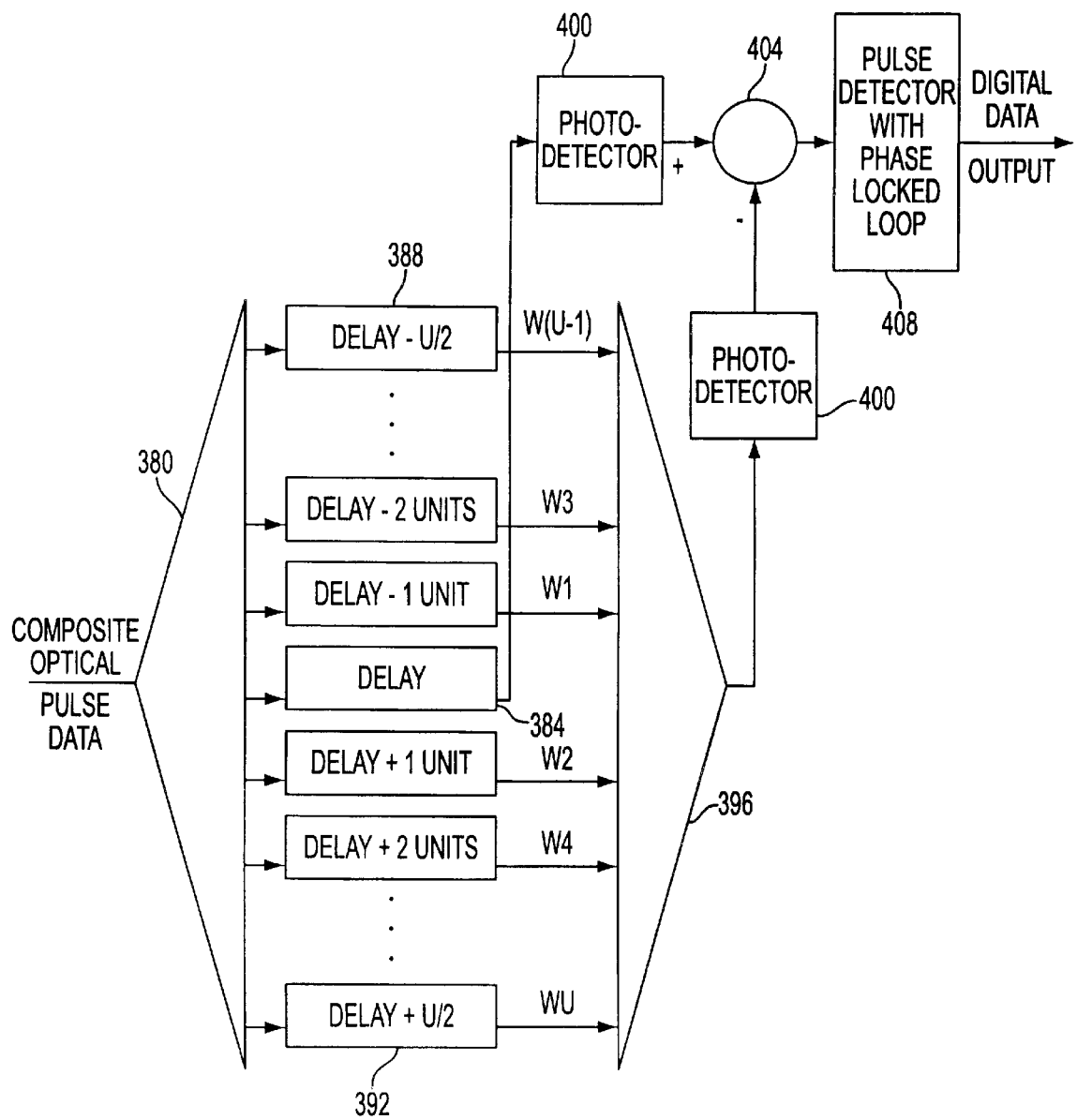
FIG. 21 is an example of a general block diagram of a pulse detection system using a fast dynamic threshold.

FIG. 21 shows an example of a general block diagram of a pulse detection system using a fast dynamic threshold. Decoded optical pulses and interference are distributed to U+1 optical channels by the coupler 380. The pulses to be detected are slightly delayed by the optical delay path 384 so that interfering pulses after the detection time can be used to help determine the detection threshold. A total of U/2 delay paths 388 sample interference after the time instant of detection while the other U/2 delay paths 392 sample interference before detection. The U×1 optical coupler 396 weights samples by W1, W2, . . . , WU and outputs their weighted sum. The number of samples used, U, and the weights are determined for the set of codes to be used. For example, U=6 with uniform weights of ⅙ could be used with the seven pulse code. The optical signals are converted to electrical signals by the photo detectors 400 so that the estimate of the interference is subtracted from the signal by the difference circuit 404. Finally, the pulses are detected and converted to digital data by the pulse detector 408 which has an oscillator with phases locked loop to track the communication data rate and insert 0's for absent data pulses.

Returning to the original single fiber example with four wavelengths and four different matrix CDMA codes, if six different wavelength orderings are used, wavelength orderings may be selected so that there is no more than one position in common between any pair of orders. For example, λ1, λ2, λ3, λ4; λ1, λ4, λ2, λ3; λ3, λ1, λ2, λ4; λ4, λ1, λ3, λ2; λ4, λ2, λ1, λ3; λ4, λ3, λ2, λ1 meets this condition. For this we have 6 (orders)×4 (time delay codes)= 24 potential simultaneous communication channels. Each ordering shares one position with each of 4 other orderings. Since four different time delay codes are used with each wavelength ordering, each shared position has the potential of causing two pulses to coincide and create a pulse doublet for each of the four different time delay codes.

Cross-channel interference at point of signal detection =

$$\frac{4 \times 4 \times [(12-2) \text{ pulses} + 1 \text{ doublet}] + [24 - 1 - (4 \times 4)] \times 12 \text{ pulses}}{16 \text{ (pulse width ratio)}} =$$

$$(10 + 5.25) \text{ pulses} + 1 \text{ doublet} = 15.25 \text{ pulses} + 1 \text{ doublet}$$

The typical single doublet is small compared to a seven pulse bit. The doublet added to the single pulses gives 17.25 pulses of interference compared to the 7 pulse desired signals. Reduced pulse width may be necessary for most applications in addition to fast adaptive thresholds.

If no more than two positions in common are allowed between any pair of wavelength orders, then all 4!=24 different orders are allowed. For this case there are 24×4=96 potential simultaneous communication channels. Any specific wavelength ordering shares two positions with six other orders and shares one position with eight other orders. The other nine orders have no positions in common. Two shared positions have the potential of allowing up to four pulses to coincide, producing a quadpulse. Also, three other channels use the same ordering as the desired signal.

Cross-channel interference at point of signal detection =

$$\frac{6 \times 4 \text{ quadpulses} + 8 \times 4 \text{ doublets} + [(12-4)6 + (12-2)8 + 12(9 + 3/4)]4 \text{ pulses}}{16 \text{ (pulse width ratio)}} =$$

$$(12 + 20 + 29.25) \text{ pulses} + 2 \text{ doublets} + 1.5 \text{ quadpulses} =$$

$$61.25 \text{ pulses} + 2 \text{ doublets} + 1.5 \text{ quadpulses}$$

This may be too much cross-channel interference. Either the single pulse or quadpulse interference can cause frequent errors. Very narrow pulses may be needed to make this example work. It would be applicable to networks where many different message addresses were needed, but where the usual message density was low or where specific subsets of the codes are permitted, according to some quality of service requirement.

Error rates can be reduced using error detection and correction data coding. For some applications, a pair of channels can be used to pulse on 0's as well as pulsing on 1's. In case of disagreement the strongest indication from the two channels could be the detection output. Both channels would utilize the fast threshold technique. An extension would be to use polarized light and polarization sensitive detectors. In this case 0's could use one polarization and 1's an orthogonal polarization. However, a more effective use of polarization would be to double the number of effective filters by independently processing the two polarizations. Additional coding could then be applied.

Several factors make this type of data network more secure. Many or all color channels, with the correct order and delay encoding, must be intercepted to reliably decode any channels. System analysis is difficult from optical terminal measurements, especially if many channels are active. Extra data can be included to keep activity high and channel assignments can be changed frequently. The total information rate on a fiber is so high that recording unprocessed data for later analysis is very difficult. In addition, special techniques can be applied to fiber optic networks to insure that they are not being tapped.

The technique of communication channel selection by scrambling channels with matrix code CDMA can be applied to any matrix code CDMA configuration, either with multiple physical channels or types of orthogonal channel coding different than light wavelength. For example, WDM can be replaced by subcarrier modulation (SCM), yielding an SCM/CDMA Hybrid or WDM can be augmented with light polarization.

Optical WDM/CDMA Hybrid coding is an alternative to WDM for the functions of switching and routing in advanced data communications and telecommunications networks. This efficient, optical WDM/CDMA Hybrid was suggested by the innovative employment of matrix codes. These matrix codes were combined with conventional WDM technology and components into new classes of WDM/CDMA Hybrids. This yields very large, scalable networks with new mechanisms for network security and control, at a reduced cost compared to a same-size network based on WDM technology alone.

The reference numerals shown on FIGS. 1–21 are summarized below:
10 WDMICDMA assembly
12 WDMICDMA assembly for multi fiber communication links
14 Conventional fiber-optic network
16 Fiber-optic network using multi fiber communication links
18 Star coupler
20 Set of F star couplers
22 Fiber-optic cable
24 Multi fiber-optic cable
26 Coder portion of WDM/CDMA assembly
28 Multi fiber coder portion of WDM/CDMA assembly
30 Decoder portion of WDM/CDMA assembly
32 Multi fiber decoder portion of WDM/CDMA assembly
34 WDM array
38 Channel sequence selector
40 Color selection switch
41 CDMA matrix permutation selector
42 CDMA matrix encoder
44 Matrix row encoders
46 Multiplexer
47 Fiber selection switch
48 Wavelength multiplexer
50 WDM demultiplexer
52 Wavelength demultiplexers
54 Channel sequence unscrambler
56 Active channel selector
57 CDMA matrix permutation selector
58 CDMA matrix decoder 60 CDMA matrix decoder
61 Matrix row decoders
62 Combiner detector
63 Multi-input, single output coupler
64 Optical to electrical converter
66 Combiner array
86 WDM continuous lasers
90 WDM multiplexer
94 Optical amplifiers
98 Optical coupler
102 Optical fiber
106 Semiconductor optical amplifier/switch or electro-optical modulator
108 1×W WDM demultiplexer
120 Electro-optical interface
124 WDM continuous sources
128 WDM multiplexer
132 Semiconductor amplifier/switches
136 WDM/CDMA Hybrid encoder
140 B×1 optical coupler
148 1×B optical coupler
152 WDM/CDMA Hybrid decoder
156 Optical pulse receiver
160 Optoelectronic interface
170 Color reference source
174 1×2 optical coupler
178 Communication network port
182 Partial optical coupler
186 Semiconductor optical amplifier/switch
190 WDM/CDMA hybrid encoder for data for a specific destination address
194 1×2 optical coupler
198 Partial optical coupler
202 Partial optical coupler
206 Partial optical coupler
210 Partial optical coupler
214 2×1 optical coupler
218 WDM/CDMA hybrid decoder for data from a specific address
222 Optical pulse receiver
230 1×2 optical switch
234 4×1 optical coupler
238 Planar substrate
242 First stage planar optical waveguides
246 Second stage planar optical waveguides
250 Third stage planar optical waveguides
254 Fourth stage planar optical waveguides
258 Electrical connections to control the switches
270 1×4 optical switch
274 4×1 optical coupler
280 2×2 optical switch
310 1×2 optical coupler
314 Optical delay paths
318 2×1 optical coupler
330 1×2 optical coupler
334 1×2 optical switch
338 Optical delay path
342 2×1 optical coupler
346 1×2 optical switch
350 1×2 optical switch
354 Optical delay path
358 2×1 optical coupler
362 2×1 optical coupler
380 1×(U+1) optical coupler
384 Optical delay path or reference delay>U/2 units
388 Optical delay path with specified delay<reference
392 Optical delay path with specified delay>reference
396 U×1 optical coupler with specified input weights
400 Photo detector
404 Electronic differencing circuit
408 Pulse detector The optical WDM/CDMA Hybrid has been described with reference to particular embodiments. Other modifications and enhancements can be made without departing from the spirit and scope of the claims that follow.

What is claimed is:

1. A hybrid wavelength division multiplexing (WDM)/code division multiple access (CDMA) communications device for a use with a network having a single optical fiber per port comprising:
   a. a coder means for:
      i. impressing digital data from an incoming, electronic, digital data stream as simultaneous short pulses onto N optical channels having wavelengths $\lambda 1$ to $\lambda N$; said channels being spatially ordered in a base sequence;
      ii. interchanging the order of said optical channels from said base sequence;
      iii. splitting and time delay encoding each of said optical channels so that multiwavelength pulse groups uniquely define a communication channel; and
      iv. combining said optical channels onto said single optical fiber; and
   b. a decoder means for:
      i. separating an incoming optical signal from said single optical fiber into said N optical channels;
      ii. re-ordering the order of said optical channels back to said base sequence;
      iii. splitting and time delay encoding, with a time delay complementary to the time delay introduced by said coder means, each of said optical channels, using a scaling factor derived from the maximum pulse replication ratio of any of said optical channels; and
      iv. combining said optical channels and outputting an outgoing, electronic, digital, data stream.

2. A hybrid wavelength division multiplexing (WDM)/code division multiple access (CDMA) communications device for a use with a network having a single optical fiber per port comprising:
   a. a coder means for:
      i. impressing digital data from an incoming, electronic, digital data stream as simultaneous short pulses onto N optical channels having wavelengths $\lambda 1$ to $\lambda N$; said channels being spatially ordered in a base sequence;
      ii. interchanging the order of said optical channels from said base sequence;
      iii. splitting and time delay encoding each of said optical channels so that each channel corresponds to a row in a code matrix; and
      iv. combining said optical channels onto said single optical fiber; and
   b. a decoder means for:
      i. separating an incoming optical signal from said single optical fiber into said is N optical channels;
      ii. re-ordering the order of said optical channels back to said base sequence;
      iii. splitting and time delay encoding, with a time delay complementary to the time delay introduced by said coder means, each of said optical channels, using a scaling factor derived from the maximum number of 1's in a row of said code matrix; and
      iv. combining said optical channels and outputting an outgoing, electronic, digital, data stream.

3. A hybrid wavelength division multiplexing (WDM)/ code division multiple access (CDMA) communications device for a use with a network having a single optical fiber per port comprising:

a. a coder comprising:
  i. a WDM means for impressing digital data from an incoming, electronic, digital data stream as simultaneous short pulses onto N optical channels having wavelengths λ1 to λN; said channels being spatially ordered in a base sequence;
  ii. a channel sequence selector means for interchanging the order of said optical channels from said base sequence;
  iii. a CDMA matrix encoder means for splitting and time delay encoding each of said optical channels so that each channel corresponds to a row in a code matrix; and
  iv. a multiplexer means for combining said channels onto said single optical fiber; and
b. a decoder comprising:
  i. a demultiplexer means for separating an incoming optical signal from said single optical fiber into said N optical channels;
  ii. a channel sequence unscrambler means for re-ordering the order of said optical channels back to said base sequence;
  iii. a CDMA matrix decoder means for splitting and time delay encoding, with a time delay complementary to the time delay of said CDMA matrix encoder, each of said optical channels, using a scaling factor derived from the maximum number of 1's in a row of said code matrix; and
  iv. an optical detector means for combining said channels and outputting an outgoing, electronic, digital, data stream.

4. A hybrid code communications device as claimed in claim 3 further comprising a phase locked loop means on said optical detector means for providing a narrow time accept gate.

5. A hybrid code communications device as claimed in claim 3 in which said optical detector means comprises an array of N optical to electrical converters connected to a multi-input, single output, electronic combiner.

6. A hybrid code communications device as claimed in claim 3 in which said optical detector means comprises a multi-input, single output coupler connected to an optical to electrical converter.

7. A hybrid code communications device as claimed in claim 3 in which said optical detector means comprises:
  a. a distributor for combining said N optical channels and distributing them among U+1 optical channels;
  b. a delay means for introducing a time delay into one of U+1 optical channels;
  c. a plurality of negative delay means for introducing said time delay minus an increasing delay into U/2 of said U optical channels;
  d. a plurality of positive delay means for introducing said time delay plus an increasing delay into U/2 of said U optical channels;
  e. a weighted coupler means for combining and weighting the positively and negatively delayed U optical channels;
  f. a first photodetector means for converting the delayed optical channel into a first electrical signal;
  g. a second photodetector means for converting the output from said weighted coupler means to a second electrical signal;
  h. a difference circuit means for calculating an estimate of interference by comparing said first and second electrical signals; and
  i. a pulse detector means with phase locked loop oscillator for tracking the communication data rate and inserting 0s for absent data pulses.

8. A hybrid code communications device as claimed in claim 3 in which said a WDM means includes a laser means for keeping said N optical channels continuously active.

9. A hybrid code communications device as claimed in claim 3 in which said WDM means comprises:
  a. a set of N continuous lasers producing light at wavelengths λ1 to λN;
  b. means for multiplexing said light onto a single channel;
  c. means for amplifying the multiplexed light;
  d. means for coupling the multiplexed light;
  e. means for pulsing the multiplexed light with said incoming, electronic, digital data; and
  f. means for demultiplexing the pulsed, multiplexed, light.

10. A hybrid code communications device as claimed in claim 9 in which said means for pulsing is an optical amplifier/switch.

11. A hybrid code communications device as claimed in claim 9 in which said means for pulsing is an electro-optical modulator.

12. A hybrid code communications device as claimed in claim 3 in which said WDM means is a semiconductor amplifier/switch, said and in which said hybrid code communications device further comprises:
  prior to said coder,
  a. a set of W continuous lasers producing light at wavelengths λ1 to λW;
  b. means for multiplexing said light onto a single channel; and
  c. means for splitting the multiplexed light;
  after said coder, a coupler means for combining said combined channels, and prior to said decoder, means for un-combining said combined channels.

13. A hybrid code communications device as claimed in claim 3 in which said hybrid code communications device is connected to a broken ring network, and said WDM means comprises:
  a. a set of N continuous lasers producing light at wavelengths λ1 to λN;
  b. means for multiplexing said light onto a single channel;
  c. means for amplifying the multiplexed light;
  d. means for distributing the multiplexed light throughout said broken ring network;
  e. means for coupling to the distributed, multiplexed light; and
  f. means for pulsing the distributed, multiplexed light with said incoming, electronic, digital data; and
  said hybrid code communications device further comprises means for coupling to said broken ring network.

14. A hybrid code communications device as claimed in claim 13 in which said means for pulsing is an optical amplifier/switch.

15. A hybrid code communications device as claimed in claim 3 in which said channel sequence selector means is an optical crossbar switch.

16. A hybrid code communications device as claimed in claim 3 in which said channel sequence unscrambler means is an optical crossbar switch.

17. A hybrid code communications device as claimed in claim 3 in which said CDMA matrix encoder means further comprises:

a. a set of Q matrix row encoder means for introducing time delays; and b. a CDMA matrix permutation selector means for conducting said N optical channels to said set of Q matrix row encoders; said Q being equal to 2N−1.

18. A hybrid code communications device as claimed in claim 3 in which said CDMA matrix decoder means further comprises:

a. a set of Q matrix row decoder means for introducing said complementary time delays; and b. a CDMA matrix permutation selector means for conducting said N optical channels to said set of Q matrix row encoders; said Q being equal to 2N−1.

19. A hybrid code communications device as claimed in claim 3 in which the functions of said channel sequence selector means and said CDMA matrix encoder means are provided by a set of N commandable universal matrix row encoders, each of which has at least one optical path, all but one of which are switch selectable, each of which includes a series of switch selectable, increasing delay paths in parallel with direct paths.

20. A method of hybrid wavelength division multiplexing (WDM)/code division multiple access (CDMA) for use with a network having a single optical fiber per port comprising the steps of:

a. providing a coder portion;

b. providing a decoder portion;

c. in said coder portion:
  i. impressing digital data from an incoming, electronic, digital data stream as simultaneous short pulses onto N optical channels having wavelengths $\lambda 1$ to $\lambda N$; said channels being spatially ordered in a base sequence;
  ii. interchanging the order of said optical channels from said base sequence;
  iii. splitting and time delay encoding each of said optical channels so that multiwavelength pulse groups uniquely define a communications channel; and
  iv. combining said optical channels onto said single optical fiber; and d. in said decoder portion:
  i. separating an incoming optical signal from said single optical fiber into said N optical channels;
  ii. re-ordering the order of said optical channels back to said base sequence;
  iii. splitting and time delay encoding, with a time delay complementary to the time delay introduced in said coder portion, each of said optical channels, using a scaling factor derived from the maximum pulse replication ratio of any of said optical channels; and
  iv. combining said optical channels and outputting an outgoing, electronic, digital, data stream.

21. A method of hybrid wavelength division multiplexing (WDM)/code division multiple access (CDMA) for use with a network having a single optical fiber per port comprising the steps of:

a. providing a coder portion;

b. providing a decoder portion;

c. in said coder portion:
  i. impressing digital data from an incoming, electronic, digital data stream as simultaneous short pulses onto N optical channels having wavelengths $\lambda 1$ to $\lambda N$; said channels being spatially ordered in a base sequence;
  ii. interchanging the order of said optical channels from said base sequence;
  iii. splitting and time delay encoding each of said optical channels so that each channel corresponds to a row in a code matrix; and
  iv. combining said channels onto said single optical fiber; and d. in said decoder portion:
  i. separating an incoming optical signal from said single optical fiber into said N optical channels;
  ii. re-ordering the order of said optical channels back to said base sequence;
  iii. splitting and time delay encoding, with a time delay complementary to the time delay introduced in said coder portion, each of said optical channels, using a scaling factor derived from the maximum number of 1's in a row of said code matrix; and
  iv. combining said optical channels and outputting an outgoing, electronic, digital, data stream.

22. A method as claimed in claim 21 further comprising the step of providing a narrow time accept gate for said combining step.

23. A method as claimed in claim 21 in which said combining step comprises the steps of converting optical data to electronic data followed by combining the electronic data.

24. A method as claimed in claim 21 in which said combining step comprises the steps of combining the optical data followed by converting the optical data to electronic data.

25. A method as claimed in claim 21 in which said combining step further comprises the steps of:

a. combining said N optical channels and distributing them among U+1 optical channels;

b. introducing a time delay into one of said U+1 optical channels;

c. introducing said time delay minus an increasing delay into U/2 of said U optical channels;

d. introducing said time delay plus an increasing delay into U/2 of said U optical channels;

e. combining and weighting the positively and negatively delayed U optical channels;

f. converting the delayed optical channel into a first electrical signal;

g. converting the output from said weighted coupler means to a second electrical signal;

h. calculating an estimate of interference by comparing said first and second electrical signals; and i. tracking the communication data rate and inserting 0s for absent data pulses.

26. A method as claimed in claim 21 further comprising the steps of:

a. providing a laser; and b. keeping said N optical channels continuously active.

27. A method as claimed in claim 21 further comprising the steps of:

a. providing a set of N continuous lasers producing light at wavelengths $\lambda 1$ to $\lambda N$;

b. multiplexing said light onto a single channel;

c. amplifying the multiplexed light;

d. coupling the multiplexed light;

e. pulsing the multiplexed light with said incoming, electronic, digital data; and f. demultiplexing the pulsed, multiplexed, light.

28. A method as claimed in claim 21 further comprising the steps of:
   a. providing a set of N continuous lasers producing light at wavelengths λ1 to λN;
   b. multiplexing said light onto a single channel;
   c. splitting the multiplexed light;
   d. feeding the split, multiplexed light to said coder portion;
   e. after said coder portion, combining said combined channels; and
   f. prior to said decoder, un-combining said combined channels.

29. A method as claimed in claim 21 in which said hybrid code communications device is connected to a broken ring network, further comprising the steps of:
   a. providing a set of N continuous lasers producing light at wavelengths λ1 to λN;
   b. multiplexing said light onto a single channel;
   c. amplifying the multiplexed light;
   d. distributing the multiplexed light throughout said broken ring network;
   e. coupling to the distributed, multiplexed light;
   f. pulsing the distributed, multiplexed light with said incoming, electronic, digital data; and
   g. providing means for coupling to said broken ring network.

30. A method as claimed in claim 21 in which said splitting and time delay encoding step performed in said coder portion further comprises the steps of:
   a. providing a set of Q matrix row encoders; said Q being equal to 2N−1;
   b. introducing time delays into each of said N optical channels; and
   c. conducting said N optical channels to said set of Q matrix row encoders.

31. A method as claimed in claim 21 in which said splitting and time delay encoding step performed in said decoder portion further comprises the steps of:
   a. providing a set of Q matrix row encoders; said Q being equal to 2N−1;
   b. introducing complementary time delays into each of said N optical channels; and
   c. conducting said N optical channels to said set of Q matrix row encoders.

32. A method as claimed in claim 21 in which said splitting and time delay encoding step performed in said coder portion further comprises the steps of:
   a. partitioning a member of a set of r pseudo-orthogonal pulse sequences into segments of length s where s is an integer;
   b. appending zeroes to the pulse sequence so that the augmented sequence is an integral multiple of s;
   c. arranging segments of length s as columns of a matrix;
   d. permuting the rows of the resulting matrix to generate up to (s−1) additional matrices; and
   e. repeating the process for all r original pulse sequences.

33. A method as claimed in claim 21 in which said splitting and time delay encoding step performed in said decoder portion further comprises the steps of:
   a. partitioning a member of a set of r pseudo-orthogonal pulse sequences into segments of length s where s is an integer;
   b. appending zeroes to the pulse sequence so that the augmented sequence is an integral multiple of s;
   c. arranging segments of length s as columns of a matrix;
   d. permuting the rows of the resulting matrix to generate up to (s−1) additional matrices; and
   e. repeating the process for all r original pulse sequences.

34. A hybrid wavelength division multiplexing (WDM)/ code division multiple access (CDMA) code communications device for a use with a network having multiple optical fibers per port comprising:
   a. a coder means for:
      i. impressing digital data from an incoming electronic data stream as simultaneous short pulses onto W optical channels having wavelengths λ1 to λW;
      ii. selecting data for M ordered optical channels from said W optical channels;
      iii. splitting and time delay encoding each of said M ordered optical channels so that multiwavelength pulse groups uniquely define a communication channel;
      iv. selecting up to W of said M ordered optical channels for each of said optical fibers; and
      v. combining said up to W optical channels onto each of said multiple optical fibers; there being F of said multiple optical fibers; said M being less than or equal to N, where N equals F multiplied by W; and
   b. a decoder means for
      i. separating an incoming optical signal from each of said multiple optical fibers into said W optical channels for a total of N optical channels;
      ii. selecting said M ordered optical channels of said N optical channels;
      iii. splitting and time delay encoding, with a time delay complementary to the time delay introduced by said coder means, each of said M ordered optical channels, using a scaling factor derived from the maximum pulse replication ratio of any of said optical channels; and
      iv. combining said M ordered optical channels and outputting an outgoing, electronic, digital, data stream.

35. A hybrid wavelength division multiplexing (WDM)/ code division multiple access (CDMA) code communications device for a use with a network having multiple optical fibers per port comprising:
   a. a coder means for:
      i. impressing digital data from an incoming electronic data stream as simultaneous short pulses onto W optical channels having wavelengths λ1 to λW;
      ii. selecting data for M ordered optical channels from said W optical channels;
      iii. splitting and time delay encoding each of said M ordered optical channels so that each channel corresponds to a row of a code matrix;
      iv. selecting up to W of said M ordered optical channels for each of said optical fibers; and
      v. combining said up to W optical channels onto each of said multiple optical fibers; there being F of said multiple optical fibers; said M being less than or equal to N, where N equals F multiplied by W; and
   b. a decoder means for
      i. separating an incoming optical signal from each of said multiple optical fibers into said W optical channels for a total of N optical channels;
      ii. selecting said M ordered optical channels of said N optical channels;

iii. splitting and time delay encoding, with a time delay complementary to the time delay introduced by said coder means, each of said M ordered optical channels, using a scaling factor derived from the maximum number of 1's in a row of said code matrix; and iv. combining said M ordered optical channels and outputting an outgoing, electronic, digital, data stream.

36. A hybrid wavelength division multiplexing (WDM)/code division multiple access (CDMA) code communications device for a use with a network having multiple optical fibers per port comprising:

a. a coder comprising:
i. a WDM means for impressing digital data from an incoming electronic data stream as simultaneous short pulses onto W optical channels having wavelengths $\lambda 1$ to $\lambda W$;
ii. a color selection switch means for selecting data for M ordered optical channels from said W optical channels and putting said M channels in a specific order;
iii. a CDMA matrix encoder means for splitting and time delay encoding each of said M ordered optical channels so that each channel corresponds a row in a code matrix;
iv. a crossbar switch means for selecting up to W of said M ordered optical channels for each of said optical fibers; and
v. a multiplexer means for combining said up to W optical channels onto each of said multiple optical fibers; there being F of said multiple optical fibers; said M being less than or equal to N, where N equals F multiplied by W; and b. a decoder comprising:
i. a demultiplexer means for separating an incoming optical signal from each of said multiple optical fibers into said W optical channels for a total of N optical channels;
ii. an active channel selector means for selecting said M ordered optical channels of said N optical channels;
iii. a CDMA matrix decoder means for splitting and time delay encoding, with a time delay complementary to the time delay of said CDMA matrix encoder, each of said M ordered optical channels, using a scaling factor derived from the maximum number of 1's in a row of said code matrix; and
iv. an optical detector means for combining said M channels and outputting an outgoing, electronic, digital, data stream.

37. A hybrid code communications device as claimed in claim 36 further comprising a phase locked loop means on said optical detector means for providing a narrow time accept gate.

38. A hybrid code communications device as claimed in claim 36 in which said optical detector means comprises an array of M optical to electrical converters connected to a multi-input, single output electronic combiner.

39. A hybrid code communications device as claimed in claim 36 in which said optical detector means comprises a multi-input, single output coupler connected to an optical to electrical converter.

40. A hybrid code communications device as claimed in claim 36 in which said optical detector means comprises:

a. a distributor for combining said M ordered optical channels and distributing them among U+1 optical channels;

b. a delay means for introducing a time delay into one of U+1 optical channels;

c. a plurality of negative delay means for introducing said time delay minus an increasing delay into U/2 of said U optical channels;

d. a plurality of positive delay means for introducing said time delay plus an increasing delay into U/2 of said U optical channels;

e. a weighted coupler means for combining and weighting the positively and negatively delayed U optical channels;

f. a first photodetector means for converting the delayed optical channel into a first electrical signal;

g. a second photodetector means for converting the output from said weighted coupler means to a second electrical signal;

h. a difference circuit means for calculating an estimate of interference by comparing said first and second electrical signals; and i. a pulse detector means with phase locked loop oscillator for tracking the communication data rate and inserting 0s for absent data pulses.

41. A hybrid code communications device as claimed in claim 36 in which said a WDM means includes a laser means for keeping said W optical channels continuously active.

42. A hybrid code communications device as claimed in claim 36 in which said WDM means comprises:

a. a set of W continuous lasers producing light at wavelengths $\lambda 1$ to $\lambda W$;

b. means for multiplexing said light onto a single channel;

c. means for amplifying the multiplexed light;

d. means for coupling the multiplexed light;

e. means for pulsing the multiplexed light with said incoming, electronic, digital data; and f. means for demultiplexing the pulsed, multiplexed, light.

43. A hybrid code communications device as claimed in claim 42 in which said means for pulsing is an optical amplifier/switch.

44. A hybrid code communications device as claimed in claim 42 in which said means for pulsing is an electro-optical modulator.

45. A hybrid code communications device as claimed in claim 36 in which said WDM means is a semiconductor amplifier/switch, said and in which said hybrid code communications device further comprises: prior to said coder, a. a set of W continuous lasers producing light at wavelengths $\lambda 1$ to $\lambda W$;

b. means for multiplexing said light onto a single channel; and c. means for splitting the multiplexed light;

after said coder, a coupler means for combining said combined channels, and prior to said decoder, means for un-combining said combined channels.

46. A hybrid code communications device as claimed in claim 36 in which said hybrid code communications device is connected to a broken ring network, and said WDM means comprises:

a. a set of W continuous lasers producing light at wavelengths $\lambda 1$ to $\lambda W$;

b. means for multiplexing said light onto a single channel;

c. means for amplifying the multiplexed light;

d. means for distributing the multiplexed light throughout said broken ring network;

e. means for coupling to the distributed, multiplexed light; and f. means for pulsing the distributed, multiplexed light with said incoming, electronic, digital data; and said hybrid code communications device further comprises means for coupling to said broken ring network.

47. A hybrid code communications device as claimed in claim 46 in which said means for pulsing is an optical amplifier/switch.

48. A hybrid code communications device as claimed in claim 36 in which said channel sequence selector means is an optical crossbar switch.

49. A hybrid code communications device as claimed in claim 36 in which said active channel selector means is an optical crossbar switch.

50. A hybrid code communications device as claimed in claim 36 in which said CDMA matrix encoder means further comprises:

a. a set of Q matrix row encoder means for introducing time delays; and
   b. a CDMA matrix permutation selector means for conducting said M ordered optical channels to said set of Q matrix row encoders; said Q being equal to 2M-1.

51. A hybrid code communications device as claimed in claim 36 in which said CDMA matrix decoder means further comprises:

a. a set of Q matrix row decoder means for introducing said complementary time delays; and
   b. a CDMA matrix permutation selector means for conducting said M ordered optical channels to said set of Q matrix row encoders; said Q being equal to 2M-1.

52. A hybrid code communications device as claimed in claim 36 in which part of the functions of said active channel selector means and all of said CDMA matrix encoder means are provided by a set of M commandable universal matrix row encoders, each of which has at least one optical path, all but one of which is switch selectable, each of which includes a series of switch selectable, increasing delay paths in parallel with direct paths.

53. A method of wavelength division multiplexing (WDM)/code division multiple access (CDMA) for a network having multiple optical fibers per port comprising:

a. providing a coder portion;
   b. providing a decoder portion;
   c. in said coder portion:
      i. impressing digital data from an incoming electronic data stream as simultaneous short pulses onto W optical channels having wavelengths $\lambda 1$ to $\lambda W$;
      ii. selecting data for M ordered optical channels from said W optical channels;
      iii. splitting and time delay encoding each of said M ordered optical channels so that multiwavelength pulse groups uniquely define a communication channel;
      iv. selecting up to W of said M ordered optical channels for each of said multiple optical fibers; and
      v. combining said up to W optical channels onto each of said multiple optical fibers; there being F of said multiple optical fibers; said M being less than or equal to N, where N equals F multiplied by W; and
   d. in said decoder portion:
      i. separating an incoming optical signal from each of said multiple optical fibers into said W optical channels per fiber for a total of N optical channels;
      ii. selecting said M ordered optical channels of said N optical channels;
      iii. splitting and time delay encoding, with a time delay complementary to the time delay of said CDMA matrix encoder, each of said M ordered optical channels, using a scaling factor derived from the maximum pulse replication rate of any of said optical channels; and
      iv. combining said M ordered optical channels and outputting an outgoing, electronic, digital, data stream.

54. A method of wavelength division multiplexing (WDM)/code division multiple access (CDMA) for a network having multiple optical fibers per port comprising:

a. providing a coder portion;
   b. providing a decoder portion;
   c. in said coder portion:
      ii. impressing digital data from an incoming electronic data stream as simultaneous short pulses onto W optical channels having wavelengths $\lambda 1$ to $\lambda W$;
      ii. selecting data for M ordered optical channels from said W optical channels;
      iii. splitting and time delay encoding each of said M ordered optical channels so that each channel corresponds to a row of a code matrix;
      iv. selecting up to W of said M ordered optical channels for each of said multiple optical fibers; and
      v. combining said up to W optical channels onto each of said multiple optical fibers; there being F of said multiple optical fibers; said M being less than or equal to N, where N equals F multiplied by W; and
   d. in said decoder portion:
      i. separating an incoming optical signal from each of said multiple optical fibers into said W optical channels per fiber for a total of N optical channels;
      ii. selecting said M ordered optical channels of said N optical channels;
      iii. splitting and time delay encoding, with a time delay complementary to the time delay of said CDMA matrix encoder, each of said M ordered optical channels, using a scaling factor derived from the maximum number of 1's in a row of said code matrix; and
      iv. combining said M ordered optical channels and outputting an outgoing, electronic, digital, data stream.

55. A method as claimed in claim 54 further comprising the step of providing a narrow time accept gate for said combining step.

56. A method as claimed in claim 54 in which said combining step comprises the steps of converting optical data to electronic data followed by combining the electronic data.

57. A method as claimed in claim 54 in which said combining step comprises the steps of combining the optical data followed by converting the optical data to electronic data.

58. A method as claimed in claim 54 in which said combining step further comprises the steps of:

a. combining said M ordered optical channels and distributing them among U+1 optical channels;
   b. introducing a time delay into one of said U+1 optical channels;
   c. introducing said time delay minus an increasing delay into U/2 of said U optical channels;
   d. introducing said time delay plus an increasing delay into U/2 of said U optical channels;
   e. combining and weighting the positively and negatively delayed U optical channels;

f. converting the delayed optical channel into a first electrical signal;

g. converting the output from said weighted coupler means to a second electrical signal;

h. calculating an estimate of interference by comparing said first and second electrical signals; and i. tracking the communication data rate and inserting 0s for absent data pulses.

59. A method as claimed in claim 54 further comprising the steps of:

a. providing a laser; and b. keeping said W optical channels continuously active.

60. A method as claimed in claim 54 further comprising the steps of:

a. providing a set of W continuous lasers producing light at wavelengths $\lambda 1$ to $\lambda W$;

b. multiplexing said light onto a single channel;

c. amplifying the multiplexed light;

d. coupling the multiplexed light;

e. pulsing the multiplexed light with said incoming, electronic, digital data; and f. demultiplexing the pulsed, multiplexed, light.

61. A method as claimed in claim 54 further comprising the steps of:

a. providing a set of W continuous lasers producing light at wavelengths $\lambda 1$ to $\lambda W$;

b. multiplexing said light onto a single channel;

c. splitting the multiplexed light;

d. feeding the split, multiplexed light to said coder portion;

e. after said coder portion, combining said combined channels; and f. prior to said decoder, un-combining said combined channels.

62. A method as claimed in claim 54 in which said hybrid code communications device is connected to a broken ring network, further comprising the steps of:

a. providing a set of W continuous lasers producing light at wavelengths $\lambda 1$ to $\lambda W$;

b. multiplexing said light onto a single channel;

c. amplifying the multiplexed light;

d. distributing the multiplexed light throughout said broken ring network;

e. coupling to the distributed, multiplexed light; and f. pulsing the distributed, multiplexed light with said incoming, electronic, digital data; and g. providing means for coupling to said broken ring network.

63. A method as claimed in claim 54 in which said splitting and time delay encoding step performed in said coder portion further comprises the steps of:

a. providing a set of Q matrix row encoders; said Q being equal to 2M−1;

b. introducing time delays into each of said M ordered optical channels; and c. conducting said M ordered optical channels to said set of Q matrix row encoders.

64. A method as claimed in claim 54 in which said splitting and time delay encoding step performed in said decoder portion further comprises the steps of:

a. providing a set of Q matrix row encoders; said Q being equal to 2M−1;

b. introducing complementary time delays into each of said N optical channels; and c. conducting said M ordered optical channels to said set of Q matrix row encoders.

65. A method as claimed in claim 54 in which said splitting and time delay encoding step performed in said coder portion further comprises the steps of:

a. partitioning a member of a set of r pseudo-orthogonal pulse sequences into segments of length s where s is an integer;

b. appending zeroes to the pulse sequence so that the augmented sequence is an integral multiple of s;

c. arranging segments of length s as columns of a matrix;

d. permuting the rows of the resulting matrix to generate up to (s−1) additional matrices; and e. repeating the process for all r original pulse sequences.

66. A method as claimed in claim 54 in which said splitting and time delay encoding step performed in said decoder portion further comprises the steps of:

a. partitioning a member of a set of r pseudo-orthogonal pulse sequences into segments of length s where s is an integer;

b. appending zeroes to the pulse sequence so that the augmented sequence is an integral multiple of s;

c. arranging segments of length s as columns of a matrix;

d. permuting the rows of the resulting matrix to generate up to (s−1) additional matrices; and e. repeating the process for all r original pulse sequences.

* * * * *